(12) United States Patent
Saito

(10) Patent No.: US 9,096,074 B2
(45) Date of Patent: Aug. 4, 2015

(54) IMAGE FORMING APPARATUS, PRINT SETTING UNIT, AND MAKING PRINT SETTING METHOD

(75) Inventor: Seiji Saito, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 66 days.

(21) Appl. No.: 13/422,342

(22) Filed: Mar. 16, 2012

(65) Prior Publication Data

US 2012/0243020 A1  Sep. 27, 2012

Related U.S. Application Data

(60) Provisional application No. 61/466,663, filed on Mar. 23, 2011, provisional application No. 61/466,661, filed on Mar. 23, 2011.

(51) Int. Cl.
*G06F 17/21* (2006.01)
*G06F 3/0483* (2013.01)
*G06F 3/0486* (2013.01)
*B41J 3/46* (2006.01)

(52) U.S. Cl.
CPC ............. *B41J 3/46* (2013.01); *G06F 3/0483* (2013.01); *G06F 3/0486* (2013.01); *G06F 17/212* (2013.01)

(58) Field of Classification Search
None
See application file for complete search history.

(56) References Cited

U.S. PATENT DOCUMENTS

| | | | |
|---|---|---|---|
| 8,516,363 | B2 | 8/2013 | Sakuramata et al. |
| 2005/0038919 | A1 | 2/2005 | Matsubara et al. |
| 2007/0146737 | A1 * | 6/2007 | Morimoto ............... 358/1.2 |
| 2008/0218816 | A1 * | 9/2008 | Sakuramata et al. ...... 358/537 |
| 2010/0085318 | A1 * | 4/2010 | Lee et al. ............... 345/173 |
| 2010/0188679 | A1 | 7/2010 | Nakagawa |

FOREIGN PATENT DOCUMENTS

| | | |
|---|---|---|
| JP | 2003-241931 | 8/2003 |
| JP | 2005-064859 | 3/2005 |
| JP | 2008-78937 | 4/2008 |
| JP | 2008-227584 | 9/2008 |
| JP | 2011-008400 | 1/2011 |
| JP | 2011-237914 | 11/2011 |
| JP | 2012-014319 | 1/2012 |

OTHER PUBLICATIONS

Office Action of Notification of Reason(s) for Refusal for Japanese Patent Application No. 2012-063471 Dated Jan. 28, 2014, 3 pgs.
Japanese Office Action for Japanese Patent Application No. 2012-063471 mailed on Aug. 26, 2014.

* cited by examiner

*Primary Examiner* — Ashish K Thomas
*Assistant Examiner* — Keara Harris
(74) *Attorney, Agent, or Firm* — Amin, Turocy & Watson, LLP

(57) ABSTRACT

An image forming apparatus of the embodiments includes a display section, an input section, a controller, and a printing section. A plurality of first images in the form of sheets and a plurality of second images targeted for printing. The input section acquires information about a position designated by a user, the position being within a display region of the display section. The controller detects that one or two or more of the plurality of second images are selected on the basis of the information about the position. In response to release of the selected second image on one of the plurality of first images, the controller makes setting such that the released second image is categorized in one group, and makes print setting for each group. The printing section prints the second image on a sheet on the basis of the print setting made by the controller.

29 Claims, 18 Drawing Sheets

IMAGE FORMING APPARATUS, PRINT SETTING UNIT, AND MAKING PRINT SETTING METHOD

CROSS-REFERENCE TO RELATED APPLICATIONS

This application is based upon and claims the benefit of priority from: U.S. provisional application 61/466,663, filed on Mar. 23, 2011; U.S. provisional application 61/466,661, filed on Mar. 23, 2011; the entire contents all of which are incorporated herein by reference.

FIELD

Embodiments described herein relate generally to a setting technique of an image forming apparatus implemented when the image forming apparatus performs printing.

BACKGROUND

There have conventionally been a driver program and an image forming apparatus for displaying a print preview screen in order for a user to see a status after printing, and for displaying a screen on which various settings including setting for selecting single-sided printing or duplex printing are made. Such a driver program and an image forming apparatus can make setting of the position of a sheet, setting for selecting single-sided or duplex printing, Nin1 setting, and the like. The Nin1 setting determines how many images to be printed are placed on one side of a sheet before the images are printed.

If the aforementioned print settings are made for a job or a document to be printed in a conventional manner, all pages in the print job or the document are given the same settings. In the case of setting for selecting single-sided or duplex printing, for example, all sheets of a document to be output are printed by single-sided or duplex printing. In the case of Nin1 setting, all sheets are also given the same Nin1 setting.

DETAILED DESCRIPTION

Figure 1:
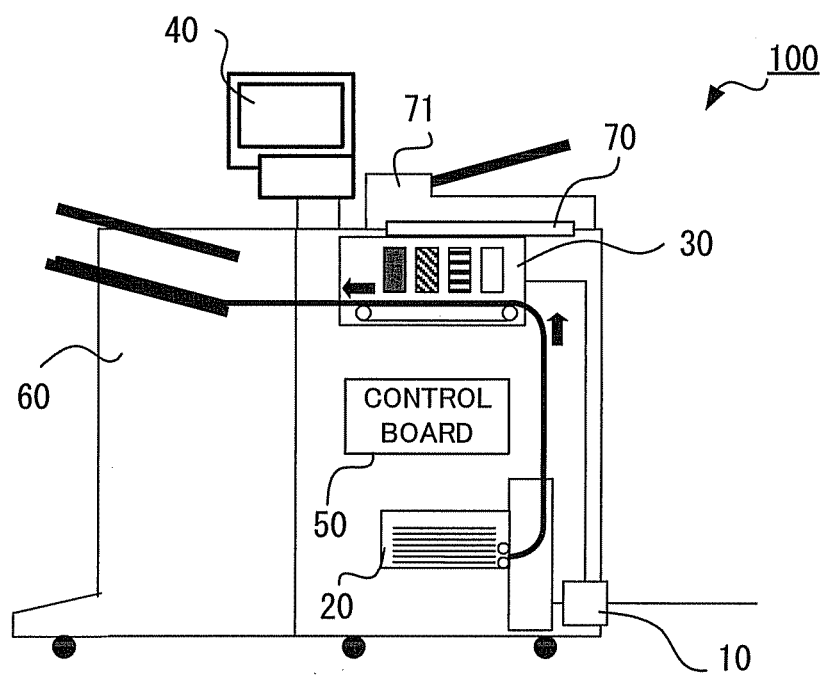
FIG. 1 is a view showing an exemplary structure of an image forming apparatus.

An image forming apparatus of embodiments includes a display section, an input section, a controller, and a printing section. A plurality of first images in the form of sheets and a plurality of second images targeted for printing are displayed on the display section. The input section acquires information about a position designated by a user, the position being within a display region of the display section. The controller detects that one or two or more of the plurality of second images are selected on the basis of the information about the position acquired by the input section. In response to release of the selected second image on one of the plurality of first images, the controller makes setting such that the released second image is categorized in one group, and makes print setting for each group. The printing section prints the second image on a sheet based on the print setting made by the controller.

The image forming apparatus of the embodiments also include a display section, an input section, a controller, and a printing section. A plurality of first images in the form of sheets, a plurality of second images targeted for printing and placed on the first images, and at least one third image functioning as a marking image are displayed on the display section. The input section acquires information about a position designated by a user, the position being within a display region of the display section. The controller detects that the third image is selected on the basis of the information about the position acquired by the input section. In response to release of the selected third image on one of the plurality of first images, the controller makes group setting such that a second image placed on the first image on which the third image is released is categorized in one group, and makes print setting for each group. The printing section prints the second image on a sheet on the basis of the print setting made by the controller.

In each of the embodiments described below, images targeted for printing are categorized in groups, and print setting including setting for selecting single-sided or duplex printing and Nin1 setting is made for the groups within a single document. If each of the embodiments described below is applied, the first half of a document can be processed by following 1in1 setting and single-sided printing, and the latter half thereof can be processed by following 2in1 setting and duplex printing, for example.

Further, the embodiments described below provide a user interface that enhances the usability of a user.

Each of the embodiments is based on the assumption that one image targeted for printing (second image) is image data formed by scanning one page of an original, or image data corresponding to one page in a document.

First Embodiment

A first embodiment will be described below by referring to the drawings.

FIG. 1 is a schematic view showing the hardware structure of an image forming apparatus of the first embodiment. An image forming apparatus 100 includes an external information input section 10, a sheet storing section 20, a printing section 30, an interface section 40 (input and output sections), a control board 50 (controller), a post-processing unit 60, and a reading section 70.

The external information input section 10 is a unit that receives print data generated by an external device such as a personal computer (hereinafter abbreviated as a PC), and includes a network interface card. The external information input section 10 further includes a FAX board connected to a telephone line or an IP communication line, and performs transmission by facsimile to and from the outside through a telephone network or an IP communication network. In addition, the external information input section 10 conforms to the USB (universal serial bus) standard, and is connectable to an external device (such as a PC or a USB memory). The external information input section 10 acquires print data or data for facsimile transmission from an external device. Data received by the external information input section 10 is temporarily stored in a storage device 51 (described later) until printing or transmission process is finished.

The sheet storing section 20 is a unit which includes a frame in which sheets are stored, and transfers sheets to a main body part of the image forming apparatus 100. The sheet storing section 20 includes a pickup roller that picks up a sheet and transfers the sheet picked up to the main body part, and a cassette for storing sheets. In the first embodiment, paper is shown as a material of sheets. However, paper is not the only material, but various materials including plastic, fabric and metal are also applicable.

The printing section 30 is a unit that forms an image in C (cyan), M (magenta), Y (yellow), and K (black) on a sheet transferred from the sheet storing section 20. The printing section 30 forms print data targeted for printing entered through the external information input section 10 or image data read by the reading section 70 on a sheet being transferred. The printing section 30 includes a process unit with a photosensitive drum, a charging drum and others for each color.

The interface section 40 is a control panel on which the status of the image forming apparatus 100 and the progress of a job are presented to a user, and through which instructions from a user and setting information are acquired. The interface section 40 includes a liquid crystal panel functioning as a display section, and a touch sensor functioning as an input section through which information about a position (designated position) in a display region of the display section touched by a user with a fingertip and the like is acquired.

The control board 50 is a board responsible for overall control of respective hardware sections in the image forming apparatus 100. The structure of the control board 50 is described in detail later.

The post-processing unit 60 is a unit responsible for process for tying a batch of sheets on which images are formed together with staples (stapling process), and process for punching holes in the same position of a plurality of sheets (hole punching process) based on a user's setting. The post-processing unit 60 includes at least a stapling device and a punching device.

The reading section 70 is a unit that scans an image formed on a document sheet placed on a transmissive tray, and converts the image on the sheet medium into electronic data. The reading section 70 includes at least the transmissive tray on which a document sheet targeted for printing is placed, a light emitting device, and a CCD (charge-coupled device) image sensor. As shown in FIG. 1, the reading section 70 may include an automatic document feeder 71.

Figure 2:
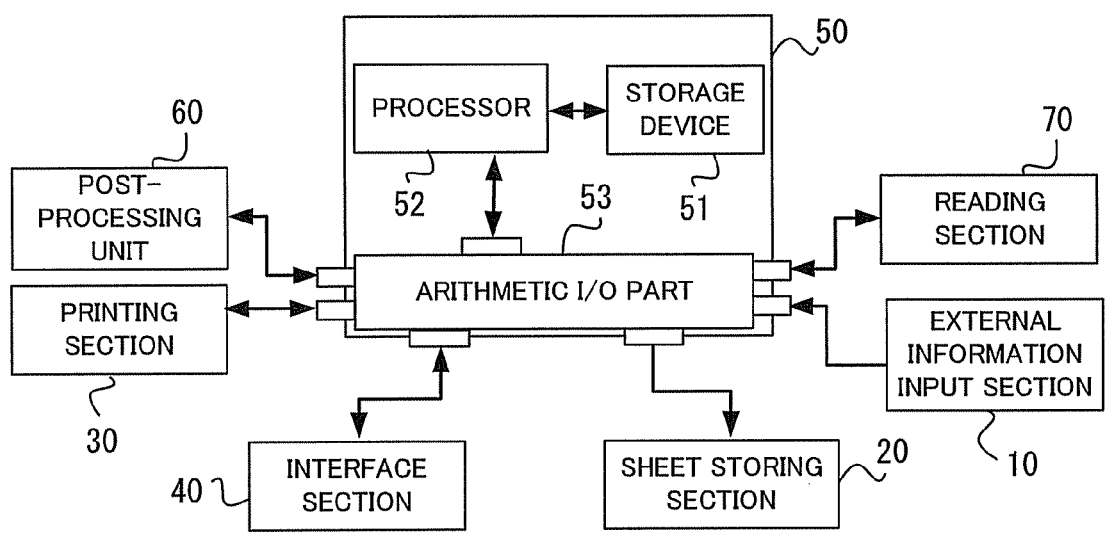
FIG. 2 is a block diagram of the image forming apparatus.

The structure of the control board 50 will be described next by referring to FIG. 2. The control board 50 includes the storage device 51, a processor 52, and an arithmetic I/O part 53. The storage device 51 is a device that stores various data and programs. The storage device 51 is composed of a RAM (random-access memory), a ROM (read-only memory), a DRAM (dynamic random-access memory), an SRAM (static random-access memory), a VRAM (video RAM), a hard disk drive, and the like. The processor 52 is an arithmetic processing unit that controls each of the hardware sections in the image processing apparatus 100 by executing the program stored in the storage device 51. The processor 52 may be a CPU (central processing unit) or an MPU (micro processing unit), for example.

The arithmetic I/O part 53 is a data bus that controls data communications between the hardware sections in the image forming apparatus 100. A control signal or data given from the processor 52 is transmitted through the arithmetic I/O part 53 to each of the hardware sections.

Figure 3:
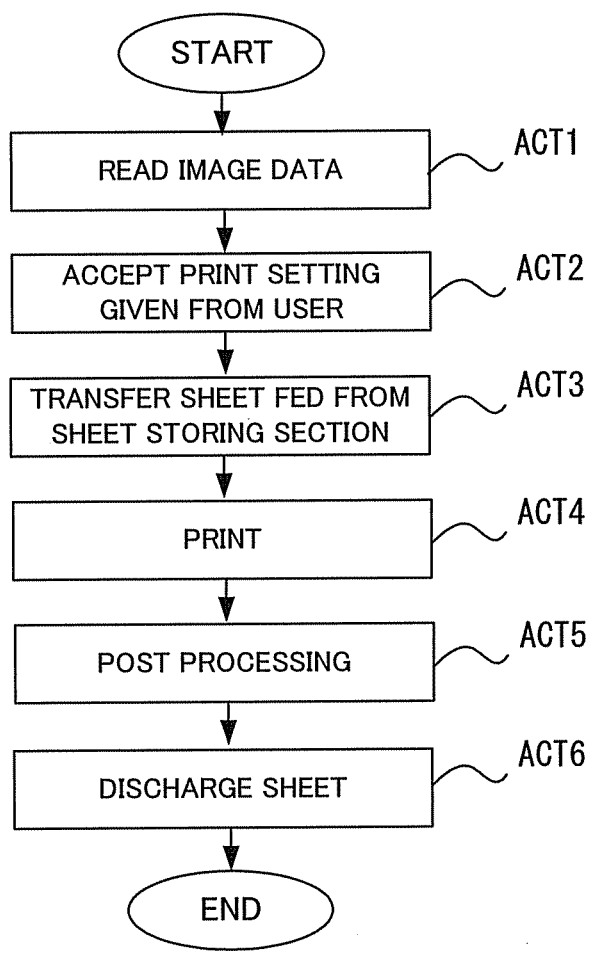
FIG. 3 is a flow chart explaining exemplary operation of the entire image forming apparatus.

FIG. 3 is a flow chart explaining exemplary operation of the image forming apparatus 100. Printing operation performed by the image forming apparatus 100 will be described below by referring to FIG. 3.

The reading section 70 scans a document sheet, and converts the scanned sheet into electronic image data (ACT 1). The image data thereby acquired is transmitted to the arithmetic I/O part 53, and then stored in the storage device 51 under control of the processor 52.

Next, the interface section 40 accepts information about print setting given from a user (ACT 2). The information about print setting includes the number of sets of pages to be printed, selection between monochrome printing and color printing, instructions for stapling or hole punching, setting for selecting single-sided or duplex printing, Nin1 setting, and the like. An example of the operation in ACT 2 will be described in detail later.

Order in which ACT 1 and ACT 2 are performed is not limited to the one shown above, but image data may be read after print setting is made. Print job information may be acquired from an external device. In this case, print setting is made by using a printer driver program installed in advance on the external device (ACT 2), and thereafter the external information input section 10 acquires print job information containing image data targeted for printing (ACT 1).

After the information about print setting is acquired from the user and instructions to execute printing is received from the user, the sheet storing section 20 feeds a sheet stored therein to the main body part of the image forming apparatus 100 (ACT 3). The printing section 30 forms an image of the image data read in ACT 1 on the sheet supplied to the printing section 30 (ACT 4). The printing section 30 forms an image on the sheet according to the information about print setting designated by the user in ACT 2 and made by the control board 50. Information about a print job contains image data targeted for printing, and information about print setting. The information about a print job is managed in units of a print job, and is stored in a print queue (in the storage device 51).

If the print job is given a setting of stapling or hole punching, the post-processing unit 60 performs post process such as stapling or hole punching on a batch of printed sheets (ACT 5). Then, the printed sheets are discharged to a predetermined tray (ACT 6).

Figure 4:
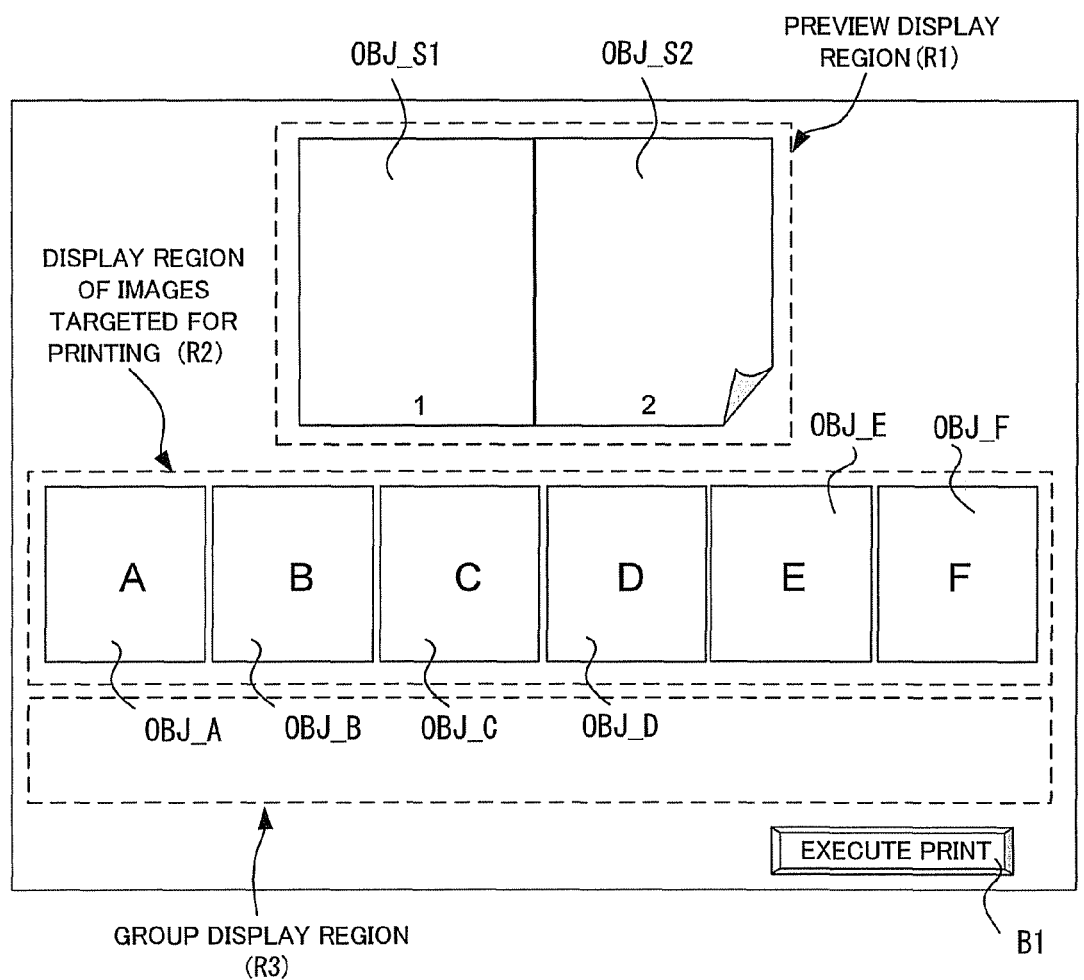
FIG. 4 is a view showing an example of display on an interface section of a first embodiment.

The operation in ACT 2 will be described in detail below. FIG. 4 shows an example of a print setting screen displayed on the interface section 40. As shown in FIG. 4, the interface section 40 includes a preview display region R1 (hereinafter called a region R1), a display region R2 of images targeted for printing (hereinafter called a region R2), and a group display region R3 (hereinafter called a region R3).

In the first embodiment, image data displayed on the interface section 40 and attribute data of the image data are contained in one data structure. As an example, attribute data includes the display size of image data, information about a group the image data belongs to, information about a region (region R1, R2 or R3, or a different region) where the image data is placed, and coordinate information indicating the display position of the image data.

In the description given below, image data in the aforementioned data structure and shown in each drawing is called an object. The object is stored in the storage device 51. Data is generated, deleted, or updated in units of an object.

The region R1 shows how each image targeted for printing and acquired in ACT 1 is to be printed. The region R1 is also a region in which a user sets the layout of image data. In the example of FIG. 4, objects OBJ_S1 and OBJ_S2 in the form of sheets (first images) appear in the region R1. In the below, an object in the form of a sheet is called a sheet object. Sheet objects are given sequential numbers that are shown at lower end portions of the corresponding sheet objects.

In response to user's action of touching a sheet object in the region R1 and slightly moving the sheet object sideways (what is called flick action), a sheet object (of a smaller number) coming before a currently displayed sheet object and a sheet object (of a larger number) coming after the currently displayed sheet object are displayed sequentially. Sheet objects of numbers 1 and 2 are shown in the example of FIG. 4. In this case, fingertip's sliding movement to the left causes sheet objects of numbers 3 and 4 to be displayed. Such sequential sliding movement to the left causes sheet objects of larger numbers to be displayed sequentially. Conversely, in response to fingertip's sliding movement to the right made while sheet objects of numbers 3 and 4 are displayed, sheet objects of numbers 1 and 2 are caused to be displayed. If image data and moving image data appearing during turning of pages are stored in advance in the storage device 51, fingertip's sideways movement allows sheets to be displayed on the interface section 40 in a manner as if they are actually turned over under control of the processor 52.

The region R2 includes read images generated by reducing the sizes of images targeted for printing acquired in ACT 1. These read images are displayed in list form in order in which they are read out, or in order of pages. In the example of FIG. 4, OBJ_A to OBJ_F (second images) that are the objects of the images targeted for printing acquired in ACT 1 are displayed in list form in the region R2. Hereinafter, these objects are called print target objects. Many images may be read so that not all print target objects can be displayed in the region R2. In this case, a user touches a place in the region R2, and slightly moves the place sideways, thereby causing print target objects coming before and after the place to appear.

In the first embodiment, any one of print target objects is touched (hereinafter, this user's action is called "selection" as may be necessary), the touched print target object is carried onto a sheet object in the region R1, and a fingertip is released from the touch panel. Then, the selected print target object is formed on the sheet object (see also FIGS. 7A and 7B). Hereinafter, operation made on one, or a plurality of different images while one or a plurality of images are selected is called "release." In the description given below, this action is mainly intended to describe action of releasing a fingertip. Meanwhile, this action may be any action, such as touch action, hardware can detect. In this example, the processor 52 acquires a coordinate (position information) detected by the touch sensor of the interface section 40, and detects the movement of the coordinate from a region of a print target object to a region of a sheet object, thereby realizing the aforementioned display control. A plurality of print target objects can be selected (as described later). A print target object selected and released on a sheet object as a result of the aforementioned operation is formed as a new object associated with the original print target object. The new object is given information for identifying a sheet object (number and name) functioning as attribute data.

In the first embodiment, a selected print target object is categorized in a group when the selected print target object is released on a sheet object. The region R3 is a region showing a group to which a print target object displayed in the region R2 belongs. In the region R3, the name of a group to which a print target object displayed in the region R2 belongs is shown directly below the corresponding print target object (see also FIG. 7B and other figures).

Print setting such as Nin1 setting is made for each group. For example, one group may be given 4in1 setting, while a different group may be given 2in1 setting. Further, one group may be given setting of duplex printing, while a different group may be given setting of single-sided printing.

In response to release of a print target object onto a sheet object, the processor 52 newly generates information about a group (hereinafter called group information), and stores the generated information to the storage device 51. The group information includes at least information for identifying a group (group name such as "Group 1"), a print setting item such as Nin1 setting, and a value of the print setting item (a default is used if the value is given for the first time). These pieces of information are stored in the storage device 51 in association with each other. The group information also contains information for identifying a sheet object and information for identifying a print target object. Thus, the group, the sheet object, and the print target object are associated with each other, and print setting made to the group is also reflected in a display layout and a printed output. This is not the only way of linking of objects, but the objects may be linked in various ways.

A print execution button B1 is a button or an image in the form of a button to be pressed when print setting is finished.

In response to press of the print execution button B1, the processor 52 confirms each print setting, and writes the layout of an image on a sheet object and various set values including a value for indicating single-sided or duplex printing into print job information. The printing section 30 executes printing in numerical order (or its reverse order) of sheet objects according to image data and print setting information contained in the confirmed print job information.

Image data such as the sheet objects and the print target objects shown in FIG. 4, position information indicating an initial position of each object, and position information indicating a current position of the object, are stored in the storage device 51. Display on the interface section 40 is controlled by execution of a predetermined drawing program or a display control program by the processor 52.

Figure 5:
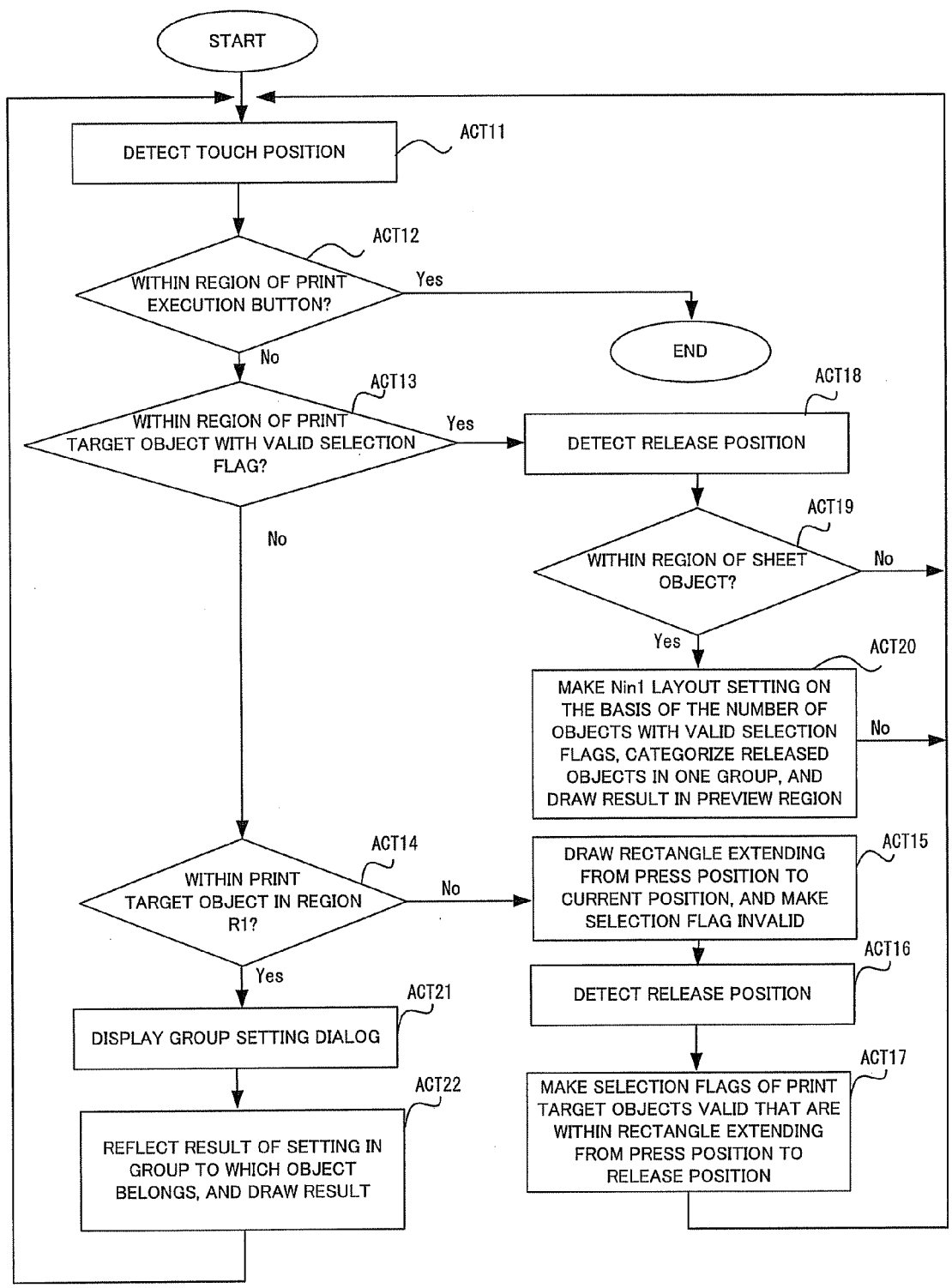
FIG. 5 is a flow chart explaining exemplary operation of the first embodiment.

FIG. 5 is a flow chart explaining the operation in ACT 2 in detail. FIGS. 6A to 11 show examples of display on the interface section 40 and examples of actions made by a user. The operation in ACT 2 will be described in detail below by referring to these figures.

The processor 52 detects a position sensed by the touch sensor of the interface section 40 (position on a display screen touched by a user) (ACT 11). For this detection, the processor 52 acquires coordinate information indicating the position touched by the user from the interface section 40.

The processor 52 determines if the touch position is within the print execution button B1 (ACT 12). If the touch position is within the print execution button B1 (ACT 12, Yes), the processor 52 confirms setting made by the user, and writes the confirmed print setting information into print job information. This is the end of the setting process. Then, operation in ACT 3 and its subsequent operations shown in FIG. 3 are performed on the basis of the print job information. Meanwhile, if the touch position is not within the print execution button 31 (ACT 12, No), the procedure proceeds to ACT 13.

Next, the processor 52 determines if the touch position detected in ACT 11 is within the region of a print target object with a valid selection flag (ACT 13). A selection flag is part of attribute data given to each print target object, and is invalid at an initial stage. Setting of a selection flag will be described later.

If the touch position detected in ACT 11 is not within a print target object with a valid selection flag (Act 13, No), the processor 52 determines if the touch position is within a print target object placed on a sheet object in the region R1 (ACT 14).

If the touch position is not within a print target object placed on a sheet object (ACT 14, No), the processor 52 draws a rectangle extending from the touch position detected in ACT 11 to a current fingertip's position (ACT 15). At this time, if there is a print target object with a valid selection flag, the processor 52 makes a valid selection flag of the print target object invalid.

Next, the processor 52 detects a release position (ACT 16). The release position corresponds to coordinate information indicating a position at which the fingertip is released. If the touch panel of the interface section 40 senses release of the fingertip, the processor 52 acquires the coordinate information.

The processor 52 specifies print target objects placed in the rectangular region extending from the touch position detected in ACT 11 to the release position detected in ACT 16, and makes selection flags for these print target objects valid (ACT 17). Then, the procedure returns to ACT 11.

Figure 6A:
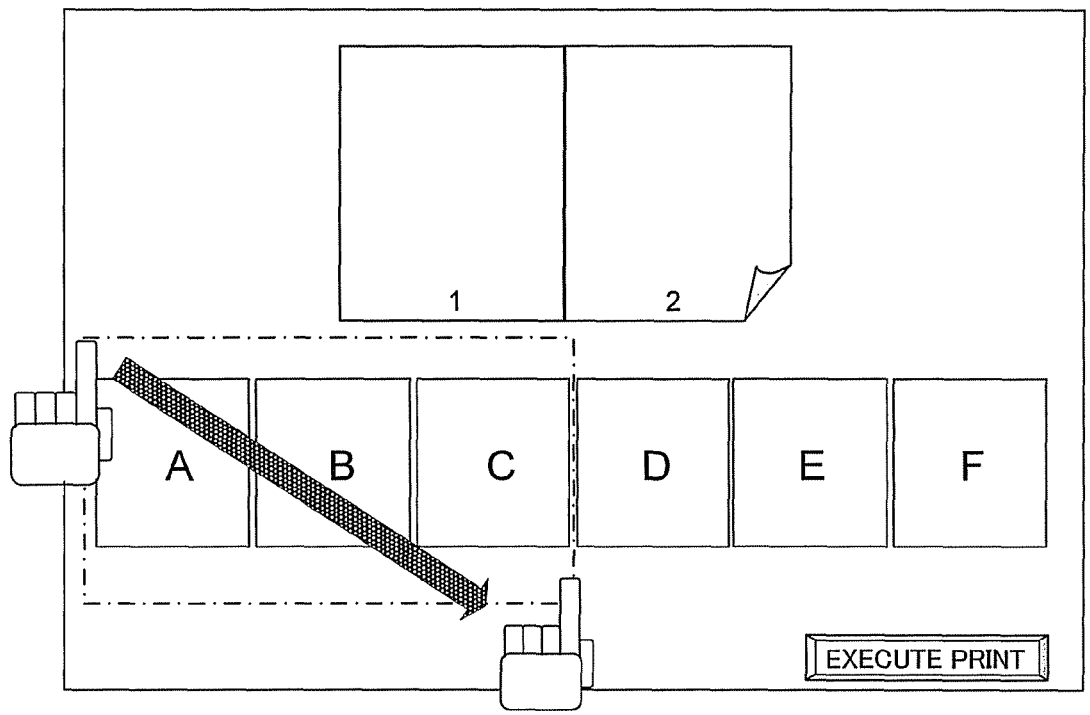
FIG. 6A is a view showing exemplary operation performed to select print target objects A to C.
Figure 6B:
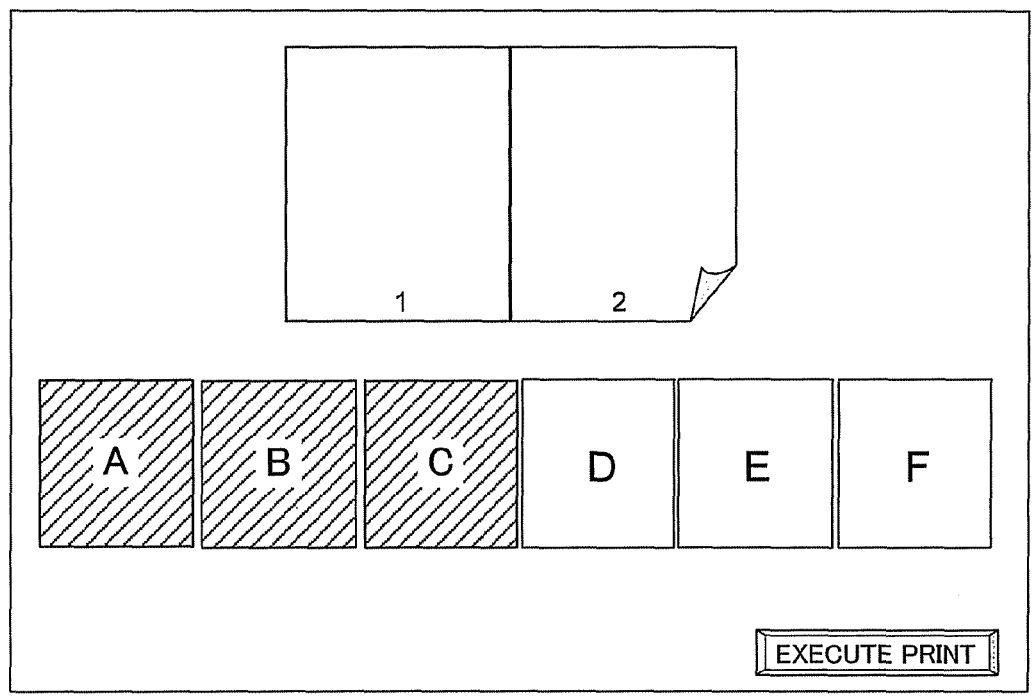
FIG. 6B is a view showing an exemplary status after the print target objects A to C are selected.

FIGS. 6A and 6B show the aforementioned user's actions made during the course from ACT 11 to ACT 17, and transitions of display on the interface section 40 appearing in the same course. FIGS. 6A and 6B show exemplary operation performed to select a plurality of print target objects. Here, OBJ_A, OBJ_B and OBJ_C are selected, for example. In order to select a plurality of print target objects, the user designates a rectangular region (region indicated by dashed-dotted lines of FIG. 6A) such that the plurality of objects are contained in the rectangular region as shown in FIG. 6A. In response to release of a fingertip, the processor 52 makes selection flags of the print target objects in the rectangular region valid, and adds cross hatching to the print target objects with the valid selection flags.

Referring back to the flow chart of FIG. 5, if it is determined in ACT 13 that a touched print target object has a valid selection flag (ACT 13, Yes), the processor 52 thereafter detects a release position (ACT 18), and then determines if the release position is within a sheet object in the region R1 (ACT 19). If the release position is not within a sheet object (ACT 19, No), the procedure returns to ACT 11.

If the release position is within a sheet object (ACT 19, Yes), the processor 52 performs the following operation in ACT 20. Then, the procedure returns to ACT 11.

(ACT 20-1) The processor 52 sets group information such that a print target object with a valid selection flag is categorized in one group.

(ACT 20-2) The processor 52 acquires the number of print target objects with valid selection flags, and makes Nin1 print setting according to the acquired number. This setting is made for the group information. For example, if there are two print target objects with valid selection flags, the processor 52 makes 2in1 setting so that two print target objects are printed on one side of a sheet. If there is three or four print target objects with valid selection flags, the processor 52 makes 4in1 setting so that four print target objects can be printed on one side of a sheet. If there is only one print target object with a valid selection flag, the processor 52 makes 1in1 setting so that one print target object is printed on one side of a sheet.

(ACT 20-3) The processor 52 controls the interface section 40 such that the print target object with a valid selection flag to be displayed in a sheet object on which the print target object is released has a uniform size. The layout of display of this print target object is determined on the basis of Nin1 setting.

Figure 7A:
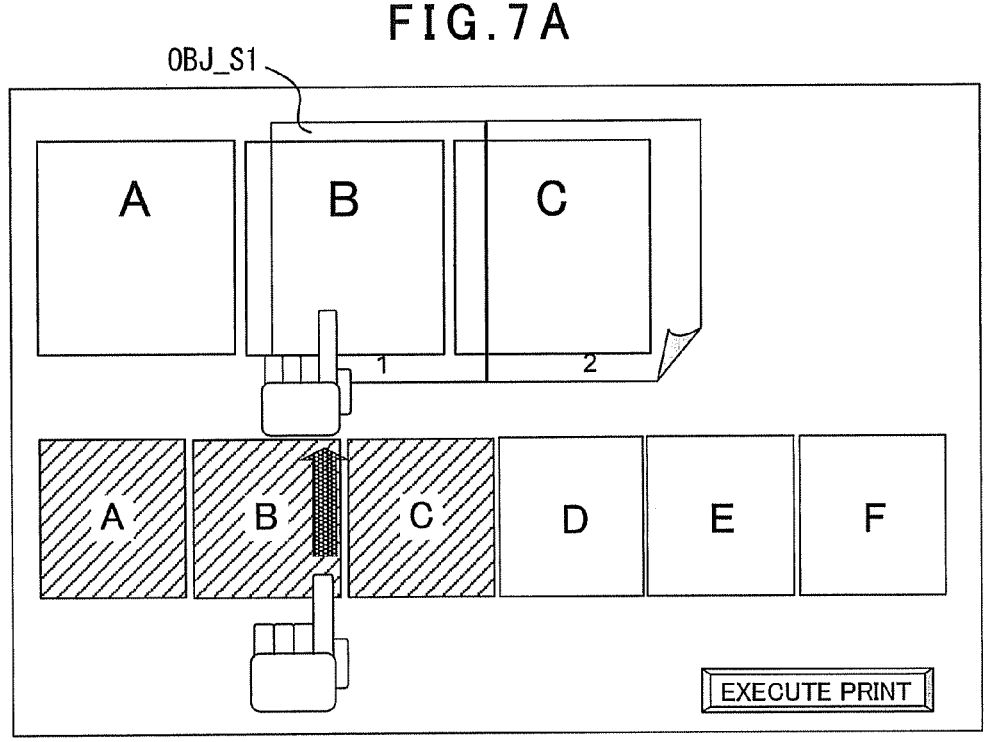
FIG. 7A is a view showing exemplary operation performed to place the print target objects A to C on a sheet object.
Figure 7B:
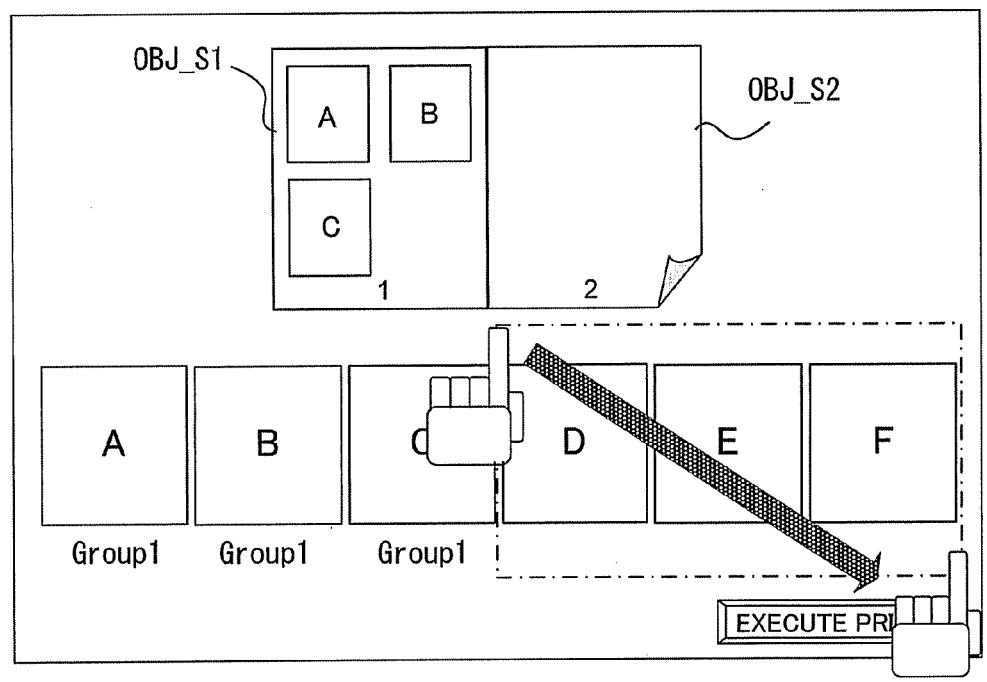
FIG. 7B is a view showing the status where the print target objects A to C are placed on a sheet object, and exemplary operation performed to select print target objects D to F.

FIGS. 7A and 7B show examples of the operation performed during the course from ACT 11 to ACT 20, and examples of display appearing in the same course. In response to touch of a print target object with a valid selection flag, the print target object moves inoperative connection with the movement of a fingertip as shown in FIG. 7A under control of the processor 52. FIG. 7A shows a status where three print target objects OBJ_A to OBJ_C are selected, and shows the movements of OBJ_A to OBJ_C in operative connection with the movement of a fingertip.

If OBJ_A to OBJ_C in this state are released on a sheet object in the region R1, as shown in FIG. 7B, the selected print target objects are displayed in the sheet object in a manner conforming to Nin1 setting responsive to the number of the selected print target objects. If the print target objects are released on one sheet object, these print target objects are categorized in the same group. FIG. 7B shows an example where OBJ_A to OBJ_C on a sheet object OBJ_S1 have a uniform size, and where OBJ_A to OBJ_C are categorized in group 1. A character string "Group 1" indicating a group to which OBJ_A to OBJ_C belong is shown in a region (region R3) below each of OBJ_A to OBJ_C.

Figure 8A:
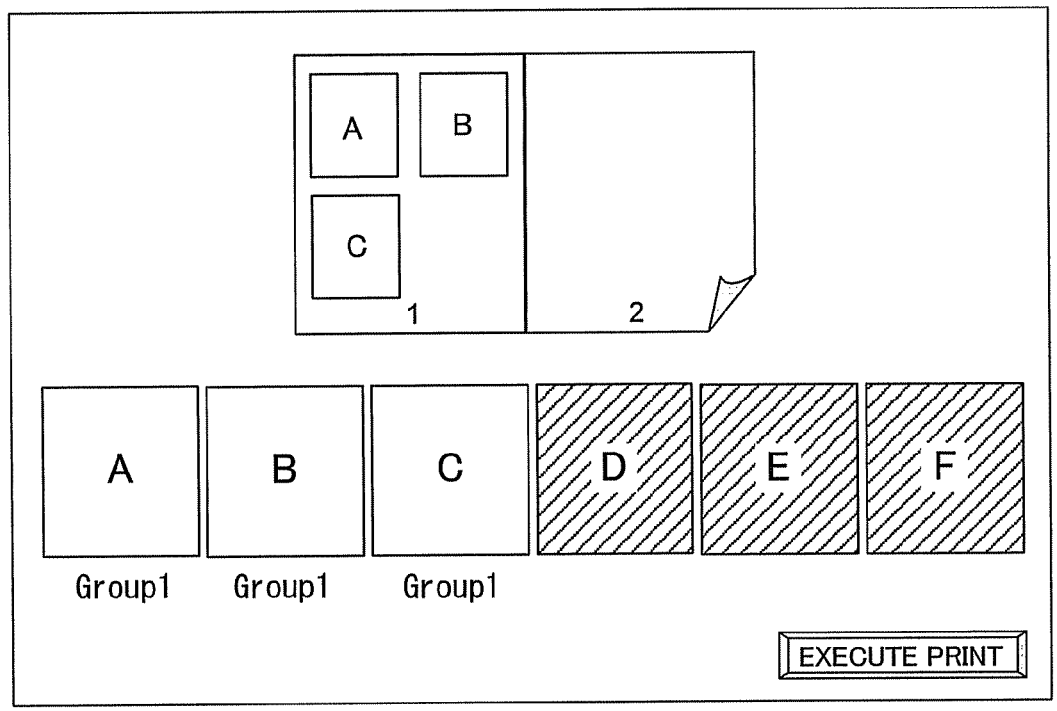
FIG. 8A is a view showing an exemplary status after the print target objects D to F are selected.
Figure 8B:
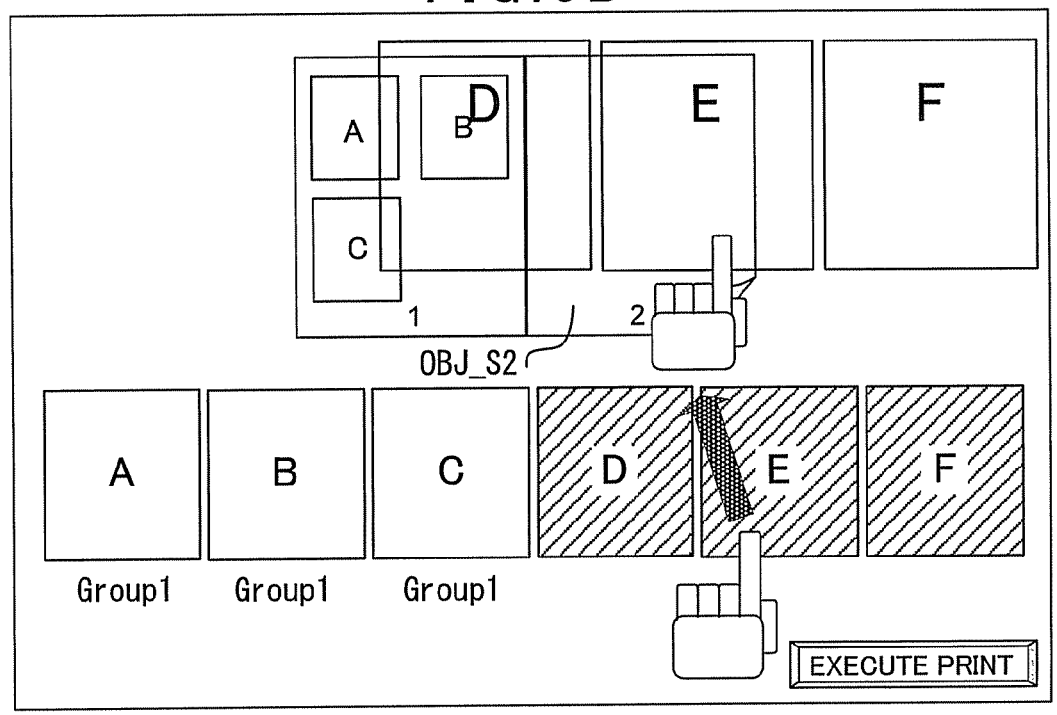
FIG. 8B is a view showing exemplary operation performed to place the print target objects D to F on a sheet object.
Figure 9A:
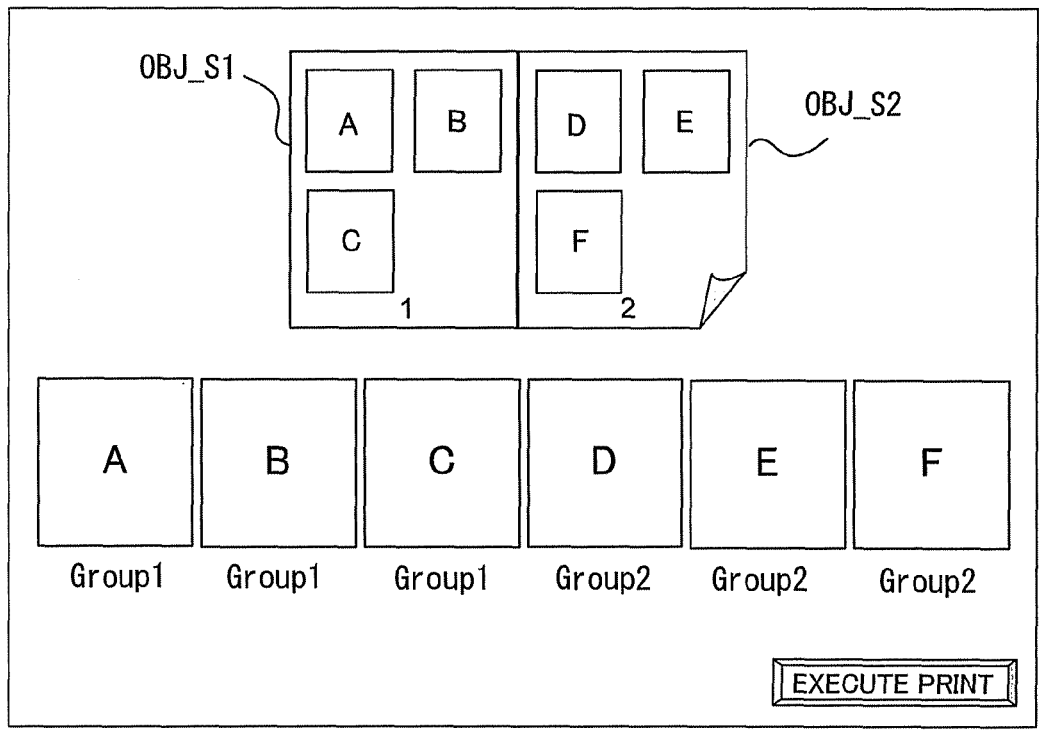
FIG. 9A is a view showing an exemplary status where the print target objects A to C are placed on one sheet object while the print target objects D to F are placed on a different sheet object, and an exemplary status where groups 1 and 2 are formed.

In the example described next by referring to FIGS. 7B to 9, OBJ_D to OBJ_F are selected and released on a sheet object OBJ_S2. FIGS. 7B and 8A show examples of the operation performed during the course from ACT 11 to ACT 17, and examples of display appearing in the same course. FIGS. 8B and 9A show examples of the operation performed during the course from ACT 11 to ACT 20, and examples of display appearing in the same course. The substances of the operation and display are the same as those described above, and accordingly, they will not be described again in detail. Additionally, these print target objects OBJ_D to OBJ_F are categorized in group 2 when they are released on a sheet object (in this example, OBJ_S2) (see FIG. 9A). Groups are given sequential numbers.

Figure 9B:
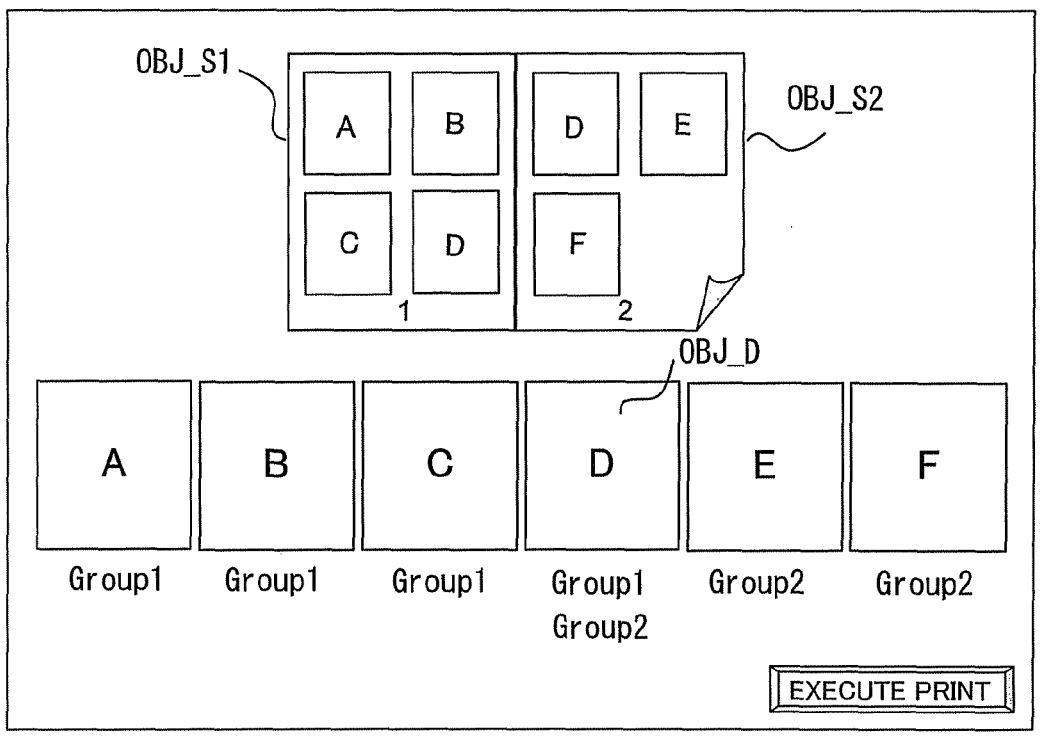
FIG. 9B is a view showing an example of display if the print target object D belongs to two groups.

One print target object may belong to a plurality of groups. FIG. 9B shows an example where OBJ_D belongs to two groups, groups 1 and 2. OBJ_A to OBJ_D are selected, and released on OBJ_S1. Next, OBJ_D to OBJ_F are selected, and released on OBJ_S2. In this case, OBJ_D belongs to two groups, groups 1 and 2 as shown in FIG. 9B. Further, the two group names of groups 1 and 2 are shown in the region R3 directly below OBJ_D.

Figure 10A:
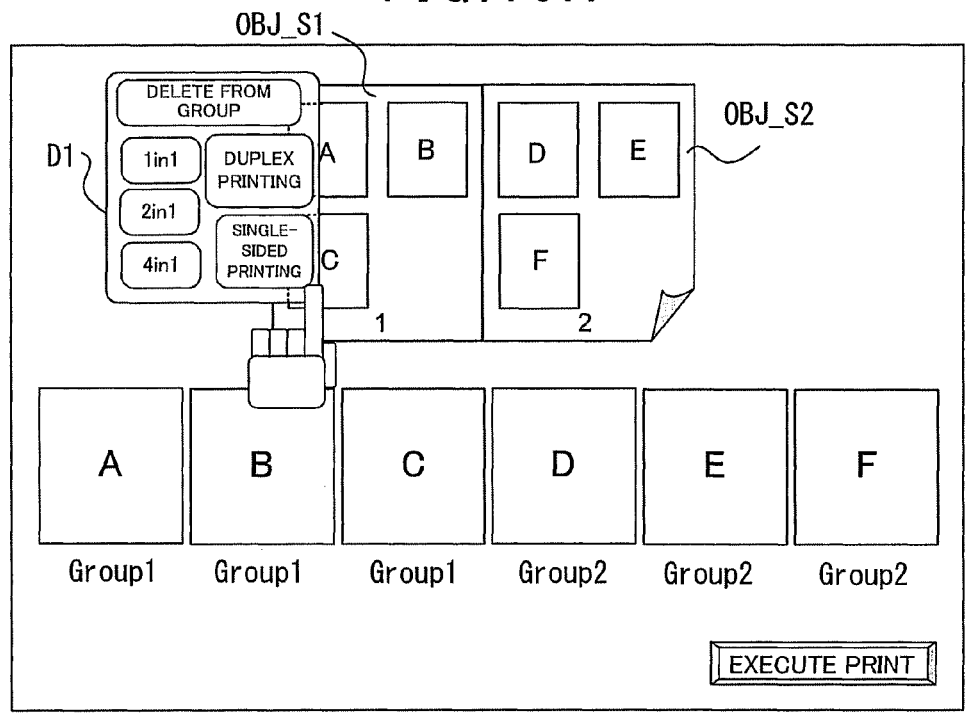
FIG. 10A is a view showing an example of display of a group setting dialog.

Referring back to ACT 14 of the flow chart of FIG. 5, if it is determined in ACT 14 that the touch position detected in ACT 11 is within a print target object in the region R1, namely within a print target object placed on a sheet object (ACT 14, Yes), the processor 52 controls the interface section 40 such that a group setting dialog is displayed on the interface section 40 (ACT 21). FIG. 10A shows an example of display appearing at this time. FIG. 10A shows a case where the touch position detected in ACT 11 is within the print target object OBJC on the sheet object OBJ_S1. A group setting dialog D1 appears in response to touch of a print target object on a sheet object. The group setting dialog D1 includes Nin1 setting buttons, setting buttons for selecting single-sided or duplex printing, and a button with which a touched print target object is deleted from a group.

The user can make each setting with press of a corresponding button in the group setting dialog D1. If any of the buttons relating to print setting is pressed by the user, the processor 52 reflects Nin1 setting and setting for selecting single-sided or duplex printing in group information held by a group to which a print target object belongs. Then, the processor 52 draws a result of the setting in the region R1 (ACT 22).

Figure 10B:
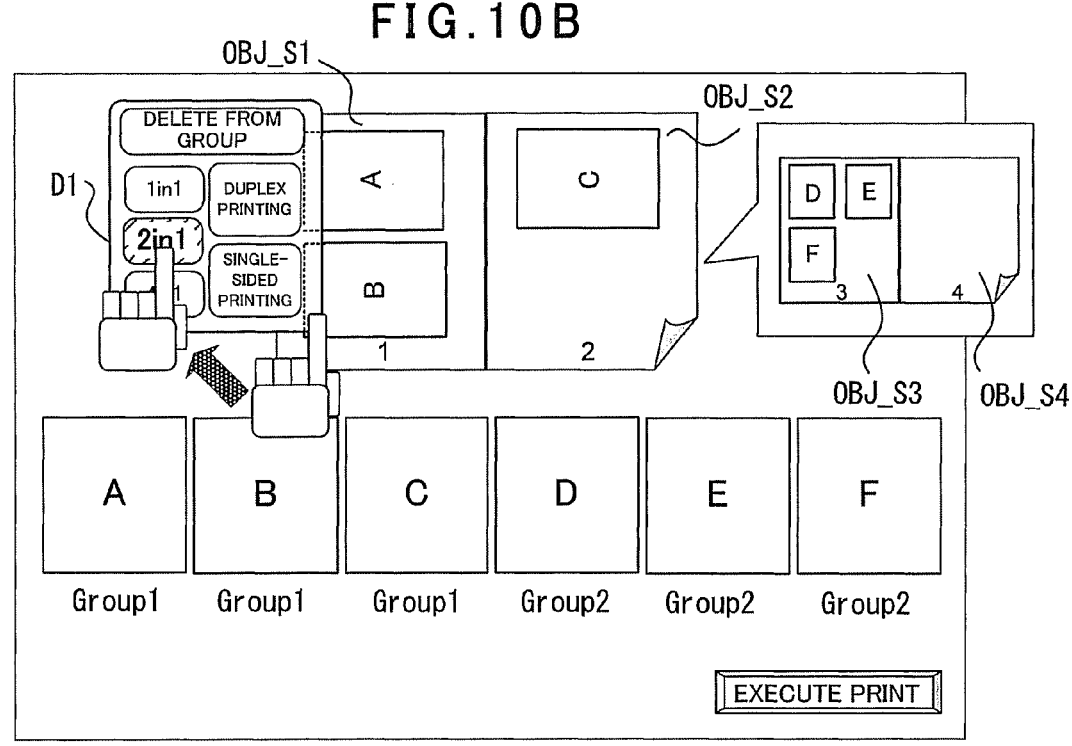
FIG. 10B is a view showing exemplary operation performed to give 2in1 setting to group 1, and an exemplary resultant status where group 1 is given the 2in1 setting.
Figure 11:
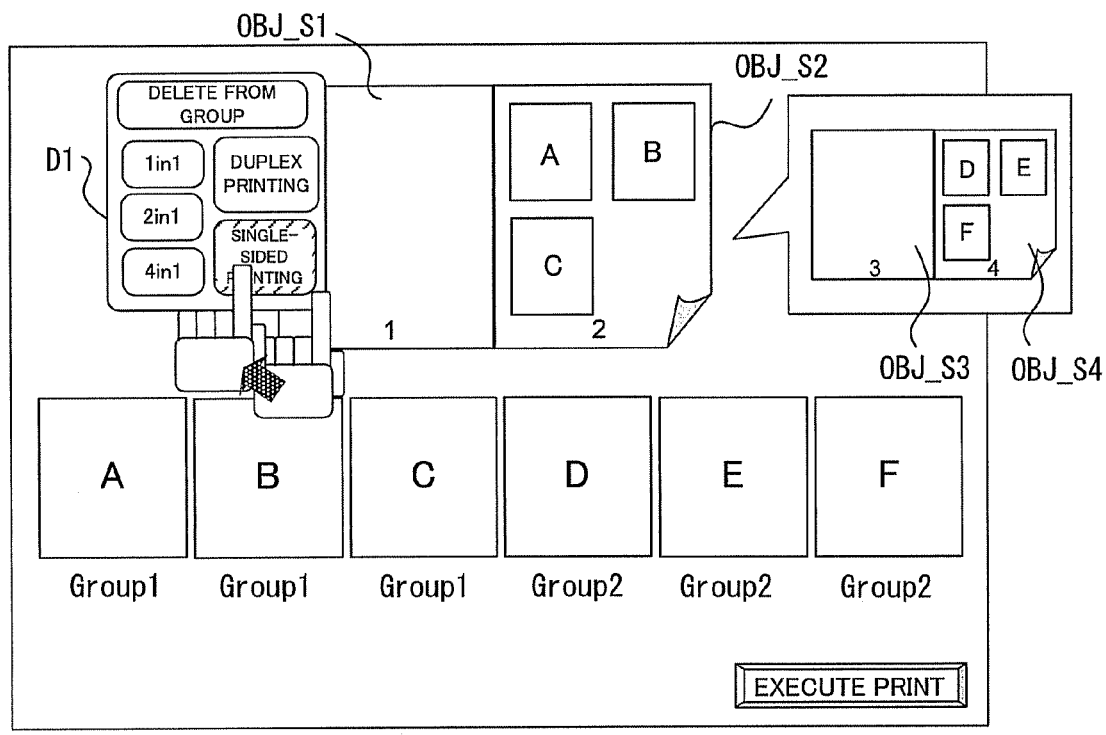
FIG. 11 is a view showing exemplary operation performed to give setting of single-sided printing to group 1, and an exemplary resultant status where group 1 is given the setting of single-sided printing.
Figure 12:
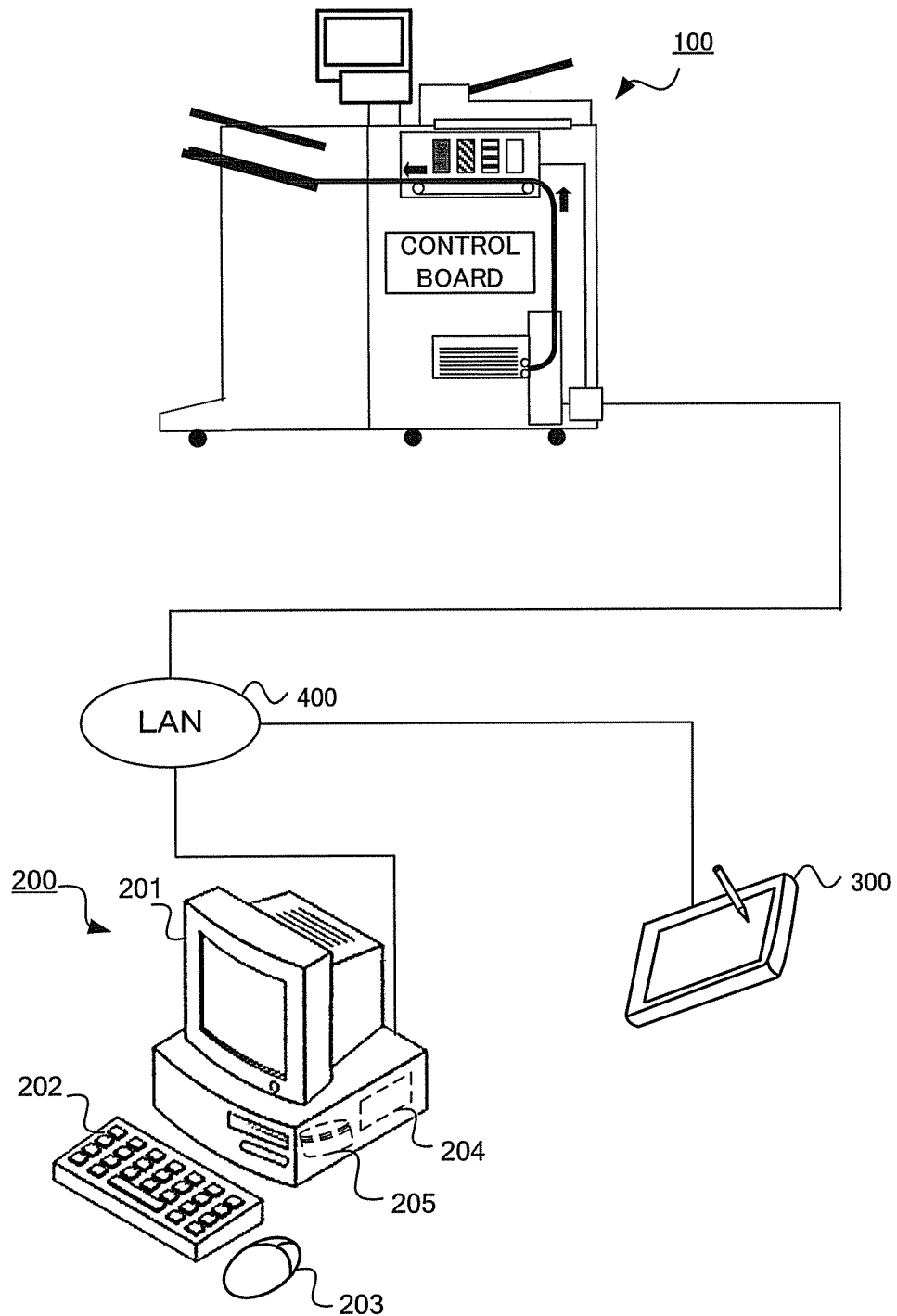
FIG. 12 is a view showing an exemplary structure where a PC and a tablet PC are used as a print setting unit.

FIGS. 10B and 11 show examples of display on the interface section 40 given in ACT 22. FIGS. 10B and 11 each show operation performed on the setting status shown in FIG. 10A (4in1 and duplex printing), and the status of display appearing after the setting. Next sheets (OBJ_S3 and OBJ_S4) are shown for reference in FIGS. 10B and 11.

FIG. 10B shows operation to change the current 4in1 setting to 2in1 setting, and the status of display appearing after the setting. The setting change is reflected through group 1 to which the touched object OBJ_C belongs. Meanwhile, the setting change is not reflected in group 2 different from group 1, but 4in1 setting is maintained in group 2 (see OBJ_S3 and OBJ_S4 of FIG. 10B).

FIG. 11 shows operation performed on the status of FIG. 10A to change the setting of group 1 from duplex printing to single-sided printing, and the status of display appearing after the setting. If setting is changed from duplex printing to single-sided printing, the processor 52 assumes a sheet object given an even number as the front side of a sheet, and a sheet object given an odd number as the rear side of the sheet. Accordingly, in the case of single-sided printing, the processor 52 makes control such that the print target objects belonging to group 1 are placed on a sheet object identified by an even number, and that no print target object is placed on a sheet object on the rear side identified by an odd number. In the example of FIG. 11, OBJ_S1 is given an odd number.

Accordingly, OBJ_A to OBJ_C shown to be placed on OBJ_S1 in FIG. 10A are moved to OBJ_S2. OBJ_S3 is on a side opposite to OBJ_S2, so that OBJ_S3 is left blank. Printing of OBJ_D to OBJ_F belonging to group 2 is started from OBJ_S4. In this example, setting of duplex printing is valid in groups other than group 1. Accordingly, regarding OBJ_S4 and its subsequent sheet objects, print target objects are placed on the sheet objects regardless of whether they are given an odd number or an even number.

In the description given above, the structure of a print setting unit includes the interface section 40 and the control board 50 in the image forming apparatus 100. Meanwhile, a PC 200 connected through the image forming apparatus 100 through a LAN (local area network) 400 may also function as the print setting unit. To be specific, the aforementioned operation may also be performed by using a CPU 204, a memory 205, a monitor 201 functioning as a display section, and a keyboard 202 and a mouse 203 functioning as an input section of the PC 200. As an example of implementation, a printer driver having a program for controlling the aforementioned display and operation is installed in advance on the memory 205. The CPU 204 executes the printer driver for printing, thereby realizing the structure of the print setting unit. In order to make the aforementioned operation of selection and operation of release on the PC 200, click, drag, and drop of the mouse 203 are applicable.

The print setting unit is also applicable to a tablet PC 300 with a CPU, a memory, and a touch panel display, or to a smartphone or a PDA (personal digital assistance). Further, the LAN 400 may be a wired or wireless LAN.

The description given above particularly refers to the case where one document is divided into two groups. Meanwhile, three or more groups can be formed by selecting a print target object and releasing the selected object on a sheet object a plurality of times.

In the description given above, a rectangular region is drawn, and a plurality of print target objects is contained in the rectangular region to select the print target objects. As a different way of selection, OBJ_A may be touched, and then a fingertip is released from OBJ_A in the region R2, for example (cross hatching is added to OBJ_A). This action is made on different objects such as OBJ_B and OBJ_C (to add cross hatching to OBJ_B and OBJ_C), and then the hatched objects are released on a sheet object, thereby categorizing these objects in one group. This method works effectively in the case where it is desired that one group be formed of OBJ_A, OBJ_B and OBJ_D excepting OBJ_C by releasing OBJ_A, OBJ_B and OBJ_D onto the same sheet object. The selected print target objects are deselected by being touched again.

In the description given above, the group setting dialog D1 is used to delete a print target object from a group after the print target object is categorized once in the group. As another implementation example, a print target object may be deleted from a group to which the print target object belongs by selecting the print target object in a sheet object, and removing the selected print target object from the region R1. At this time, the processor 52 excludes the deleted object from its control, and releases a resource thereof at an arbitrary time.

Further, in order to move a print target object to a different group after the print target object is categorized in one group, the print target object is touched, and then released on a different sheet object, thereby changing the group of the print target object.

Second Embodiment

In a second embodiment, a document is divided into groups by using an object in the form of a label. Except for the matter described below, the structure and the operation of the second embodiment including a hardware structure and the entire operation of an image forming apparatus are the same as those of the first embodiment, and accordingly they will not be described again (see FIGS. 1 to 3, and 12).

Figure 13:
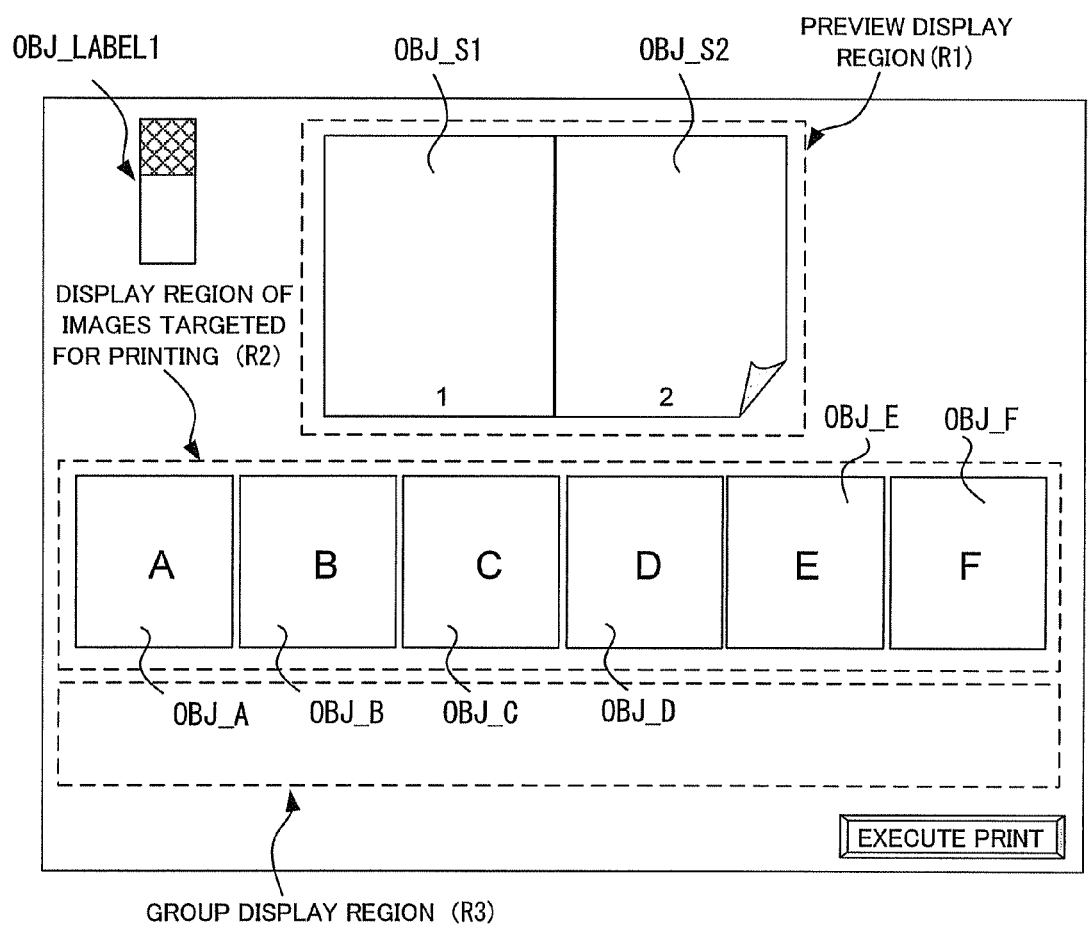
FIG. 13 is a view showing an example of display on an interface section of a second embodiment.

FIG. 13 shows an example of display on an interface section 40 of the second embodiment. In the second embodiment, an object in the form of a label (OBJ_LABEL1 (third image) in the example of FIG. 13) is displayed on the interface section 40 in addition to the sheet objects, the print target objects, and the print execution button B1 described in the first embodiment. The regions R1 to R3 described in the first embodiment are also provided. In the below, an object in the form of a label is called a label object. In the second embodiment, print target objects are categorized in groups by using the label object.

Figure 14:
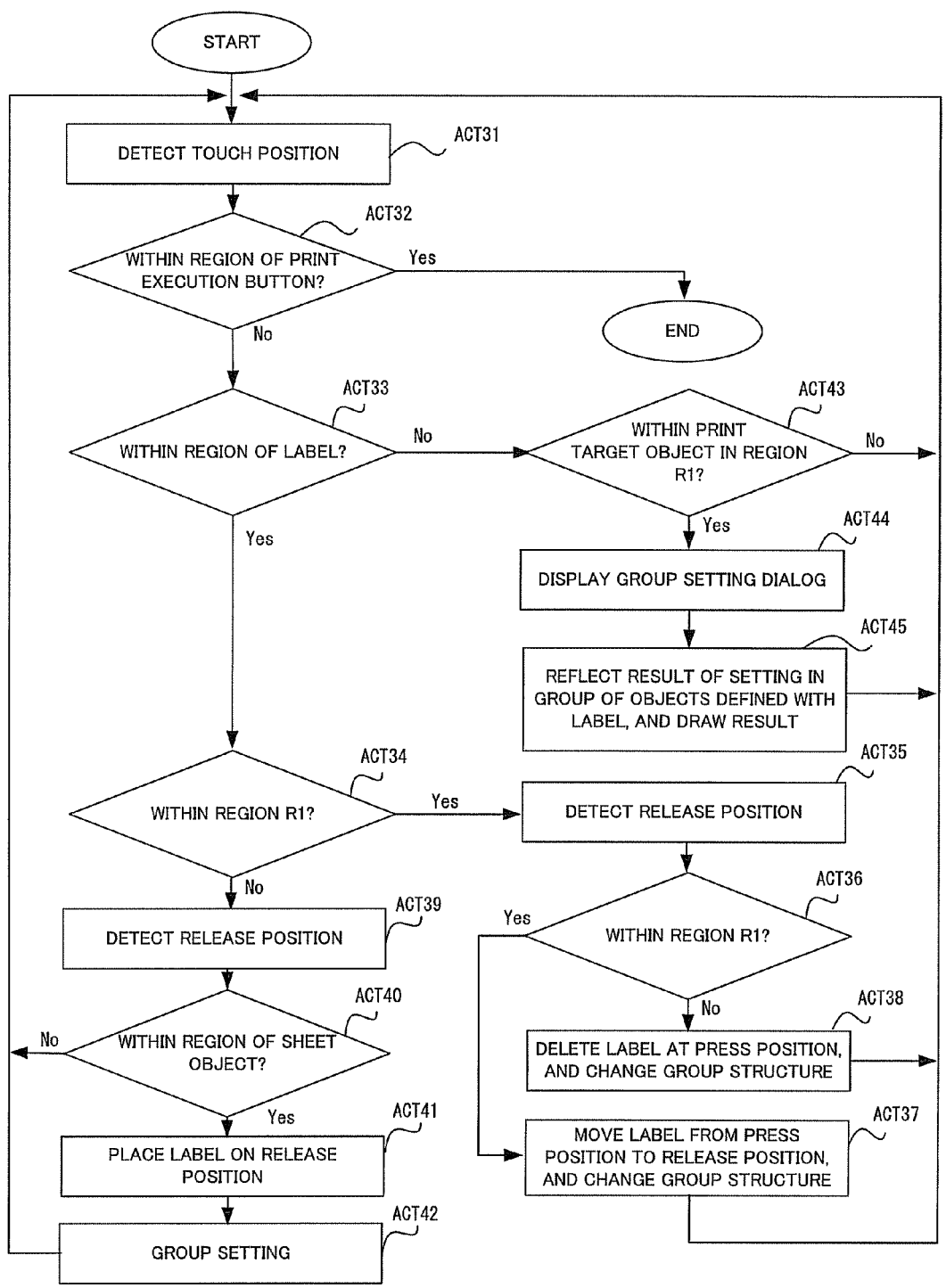
FIG. 14 is a flow chart explaining exemplary operation of the second embodiment.

FIG. 14 is a flow chart explaining the print setting operation of the second embodiment. FIGS. 15A to 17 show examples of operation performed on the interface section 40 and examples of transitions of screens. Further, the following description is based on the assumption that a print target object is already placed on a sheet object by following the method described in the first embodiment.

ACT 31 and ACT 32 shown in the flow chart of FIG. 14 are the same as the corresponding operations of the first embodiment. To be specific, a processor 52 detects a position sensed by a touch sensor of the interface section 40 (ACT 31), and determines if the touch position is within the print execution button B1 (ACT 32). If the touch position is within the print execution button 31 (ACT 32, Yes), the processor 52 confirms setting made by a user, and writes the confirmed print setting information into print job information. Then, the procedure proceeds to ACT 3 of FIG. 3. Meanwhile, if the touch position is not within the print execution button B1 (ACT 32, No), the procedure proceeds to ACT 33.

The processor 52 determines if the touch position detected in ACT 31 is within the region of a label object (ACT 33). If the touch position detected in ACT 31 is within the region of a label object (ACT 33, Yes), the processor 52 determines if the touch position is within the region R1 (ACT 34). The processor 52 determines in ACT 34 if the touched label object is an object placed on a sheet object (described later).

If the touch position is not within the region R1 (ACT 34, No), the processor 52 performs the same operation as that of the first embodiment to detect a release position (ACT 39), and then determines if the release position is on a sheet object in the region R1 (ACT 40). If the release position is on a sheet object (ACT 40, Yes), the processor 52 places the label object on the sheet object including the release position (ACT 41). The processor 52 also determines a group of each print target object such that a sheet with a label object becomes a boundary between groups (ACT 42). The procedure returns to ACT 31 when the operation in ACT 42 is finished.

Figure 15A:
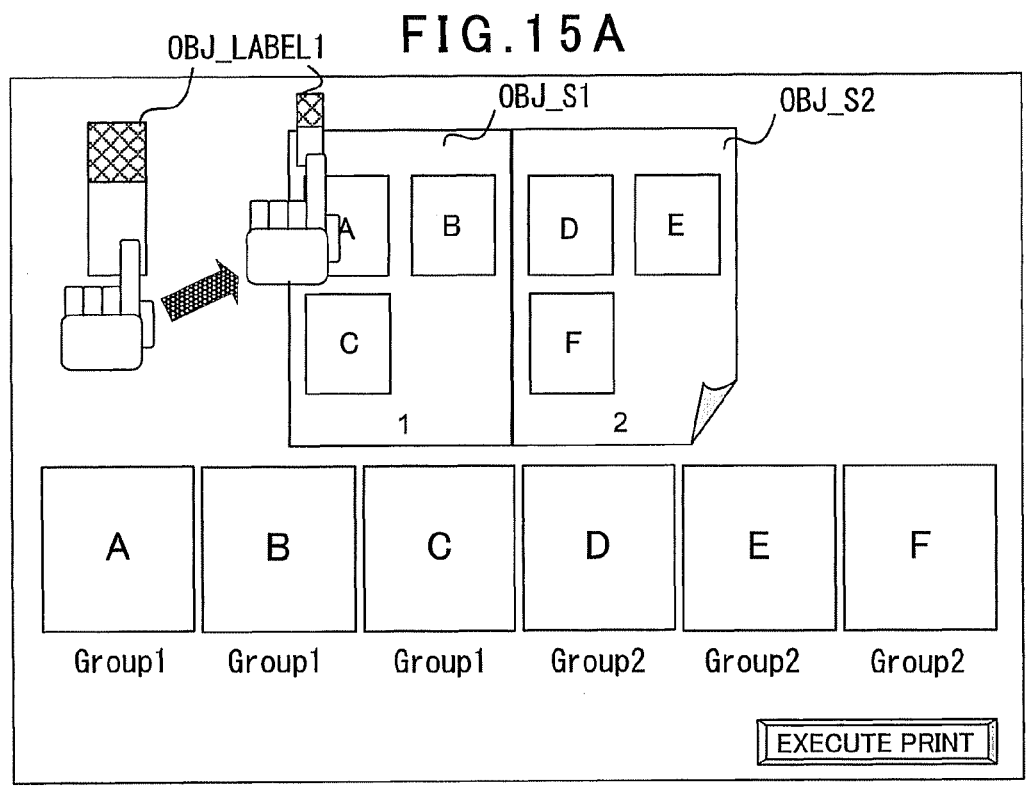
FIG. 15A is a view showing exemplary operation performed to place a label object on a sheet object.

FIG. 15A shows examples of the operation performed during the course from the aforementioned detection of a touch position in ACT 31 to the aforementioned group setting in ACT 42, and examples of display appearing in the same course. The example of FIG. 15A shows that OBJ_LABEL1 is placed on OBJ_S1.

If the touch position is within a label object (in the example of FIG. 15A, OBJ_LABEL1) and if the label object continues to be touched, the label object moves in operative connection with the movement of a fingertip under control of the processor 52. If the label object in this status is released on a sheet object (in the example of FIG. 15A, OBJ_S1), the released label object is placed at an upper end portion of OBJ_S1. Further, the processor 52 makes setting such that a print target object (in the example of FIG. 15A, OBJ_A to OBJ_C) on the sheet object on which the label object is placed is categorized in one group. If there is a sheet object coming before the sheet object given the label object (sheet object of a number smaller than the number of the sheet object given the label object), the processor 52 makes setting such that print target objects on these sheet objects are categorized in the same group. Here, it is assumed that there is a sheet object of number 0 and that a print target object is placed on the sheet object of number 0, for example. In this case, print target objects on the sheet objects of numbers 0 and 1 are all categorized in group 1.

Group information of the second embodiment contains, in addition to the group information of the first embodiment, information for identifying a label object (such as a sequential number and an identifying name). Accordingly, a label object, a print target object, and a sheet object are associated with each other by the group information.

Regarding a sheet object coming after the sheet object given the label object (sheet object of a number larger than the number of the sheet object given the label object), and a sheet object still coming after the subsequent sheet object, the processor 52 makes setting such that print target objects on these subsequent sheet objects are categorized in a different group. In the example of FIG. 15A, OBJ_LABEL1 is placed on OBJ_S1. Accordingly, OBJ_D to OBJ_F placed on a subsequent sheet OBJ_S2 are categorized in group 2. Like in the first embodiment, the names of groups to which print target objects belong are shown in the region R3.

Referring back to the flow chart of FIG. 14, after it is determined that the touch position detected in ACT 31 is within the region of a label object (ACT 33, Yes), and that this touch position is within the region R1 (ACT 34, Yes), the processor 52 detects a release position (ACT 35). If the release position is on a different sheet object in the region R1 (ACT 36, Yes), the processor 52 moves the label object from the touch position to the sheet object on which a fingertip was released, and then makes group setting again (ACT 37). Then, the procedure returns to ACT 31.

Figure 15B:
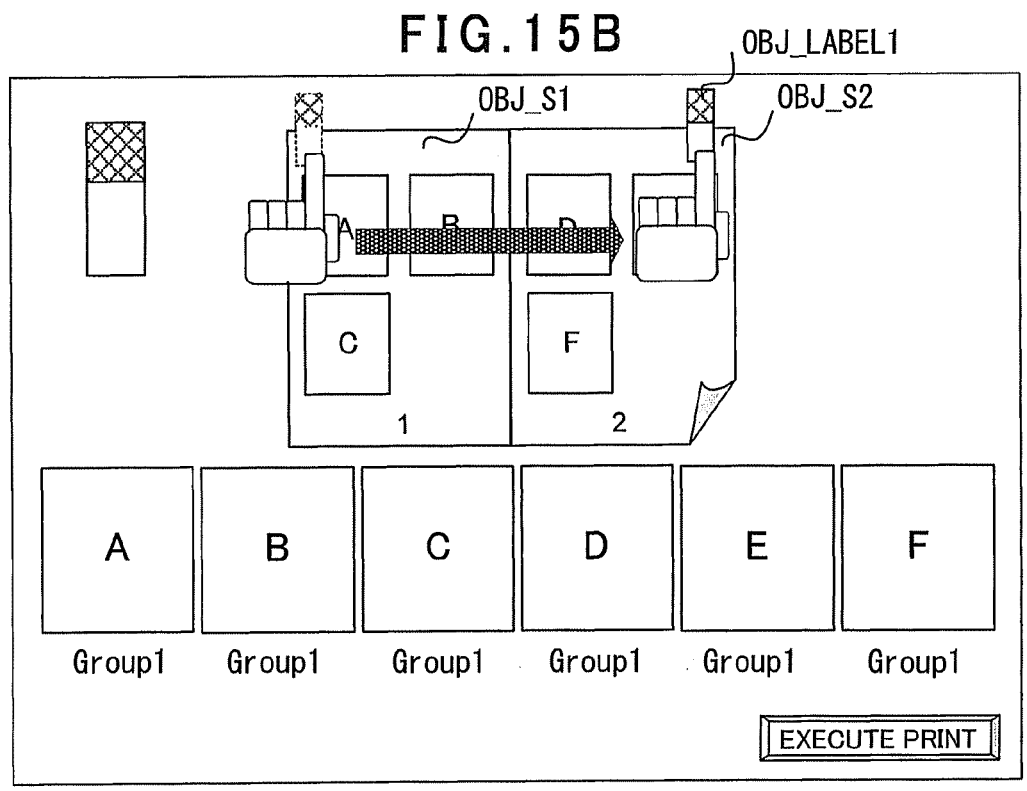
FIG. 15B is a view showing exemplary operation performed to move a label object to a different sheet object.

FIG. 15B shows examples of the aforementioned operation performed during the course from ACT 31 to ACT 37, and examples of display appearing in the same course. In the example shown in FIG. 15B, OBJ_LABEL1 on OBJ_S1 is moved to OBJ_S2.

When a label object placed on a sheet object is touched, moved to a different sheet object, and then released on the different sheet object, the processor 52 controls the label object to move to an upper end portion of the sheet object on which the label object was released. Further, the processor 52 makes setting such that a print target object on the sheet object to which the label object has been moved, and a print target object on a sheet object coming before this sheet object are categorized in the same group. If OBJ_LABEL1 is moved from OBJ_S1 to OBJ_S1 as shown in FIG. 15B, print target objects (OBJ_A to OBJ_F) placed on OBJ_S2 and on a sheet object coming before OBJ_S2 are all categorized in group 1. If there is a print target object placed on a sheet object coming after OBJ_S2, this print target object is categorized in a different group (such as group 2).

Figure 16:
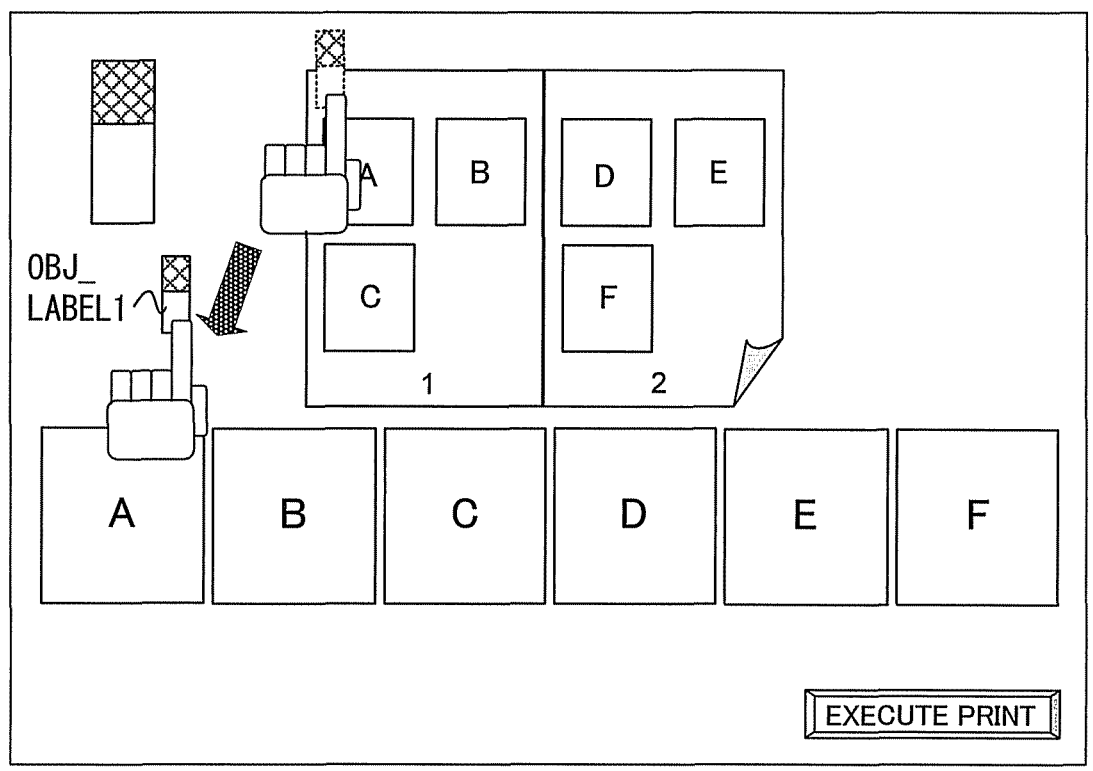
FIG. 16 is a view showing exemplary operation performed to delete a label object from a sheet object.

If it is determined in ACT 36 in the flow chart of FIG. 14 that the release position is not within the region R1 (ACT 36, No), the label object touched in ACT 31 is deleted, and a group structure is changed (ACT 38). The procedure thereafter returns to ACT 31. FIG. 16 shows an example of the operation performed at this time and an example of display appearing at this time. When a label object (OBJ_LABEL1) placed on a sheet object is touched and then released on a position outside the region R1, the indication of this label object disappears. In addition, in the example of FIG. 16, the processor 52 deletes group information from a storage device 51 that was generated on the basis of the deleted label object. While group names are shown in the region R3 in FIG. 15A, these names are deleted from the region R3 in FIG. 16.

Referring back to the flow chart of FIG. 14, if the touch position detected in ACT 31 is not within the region of a label object (ACT 33, No), the processor 52 determines if the touch position is within a print target object in the region R1 (ACT 43). If the touch position is on a print target object in the region R1 (ACT 43, Yes), the processor 52 controls the interface section 40 such that a group setting dialog D1 appears on the interface section 40 (ACT 44). A user makes setting action on the group setting dialog D1, and thereafter, the processor 52 makes control such that print setting is reflected in a group to which the touched print target object belongs, and then a result is drawn (ACT 45). The operations in ACT 44 and ACT 45 are the same as those in ACT 21 and ACT 22 of the first embodiment, respectively.

Figure 17:
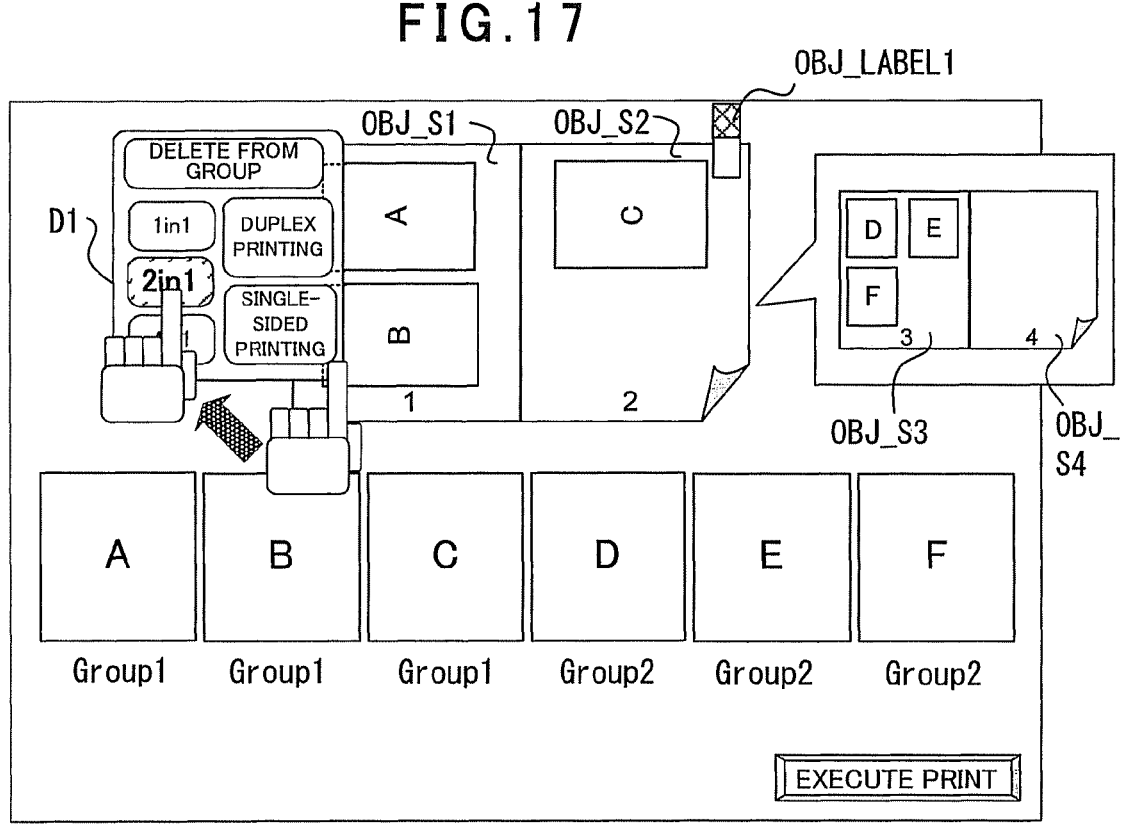
FIG. 17 is a view showing exemplary operation performed to give 2in1 setting to group 1 on a group setting dialog, and an exemplary resultant status where group 1 is given the 2in1 setting.

FIG. 17 shows an example of the operation performed in response to touch of OBJ_C on OBJ_S1 in the status shown in FIG. 15A. FIG. 17 also shows the group setting dialog D1, and an example of display appearing after 4in1 setting is changed to 2in1 setting. The detailed operation performed here is the same as that in the first embodiment, and accordingly, it will not be described again. Additionally, objects including OBJ_C are categorized in group 1, and OBJ_C has been moved from OBJ_S1 to OBJ_S2. Accordingly, a label object indicating a boundary between groups is also moved from OBJ_S1 to OBJ_S2.

Figure 18A:
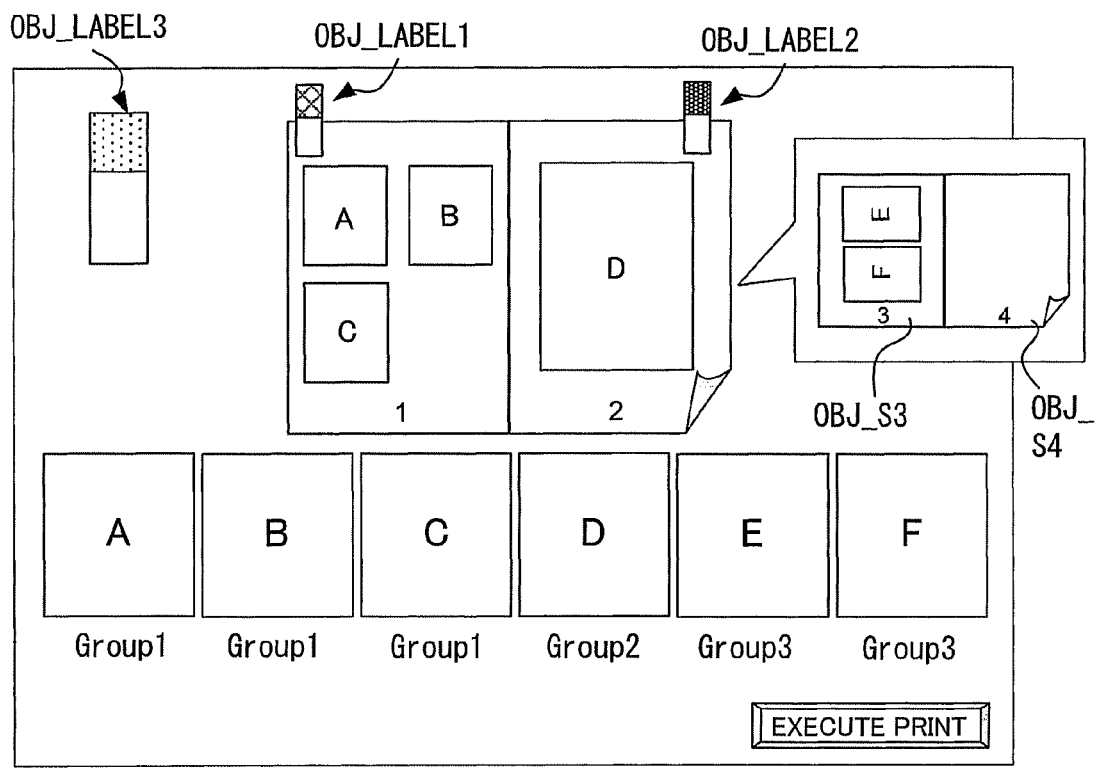
FIG. 18A is a view showing an exemplary condition where a plurality of label objects are placed.

The description given above particularly refers to the case where one label object is used to form two groups. Meanwhile, a plurality of groups can certainly be formed by using a plurality of label objects as described next by referring to FIG. 18A. FIG. 18A shows a status where two label objects including OBJ_LABEL1 and OBJ_LABEL2 are placed on sheet objects. In this example, three groups including groups 1 to 3 are formed by the two label objects. Group 1 is given 4in1 setting, group 2 is given 1in1 setting, and group 3 is given 2in1 setting. Four groups are formed if OBJ_LABEL3 is added in this status. Further, upper end portions of the label objects may be indifferent colors as shown in FIG. 18A. As described, print setting can be made for each of a plurality of groups formed by dividing one document.

Figure 18B:
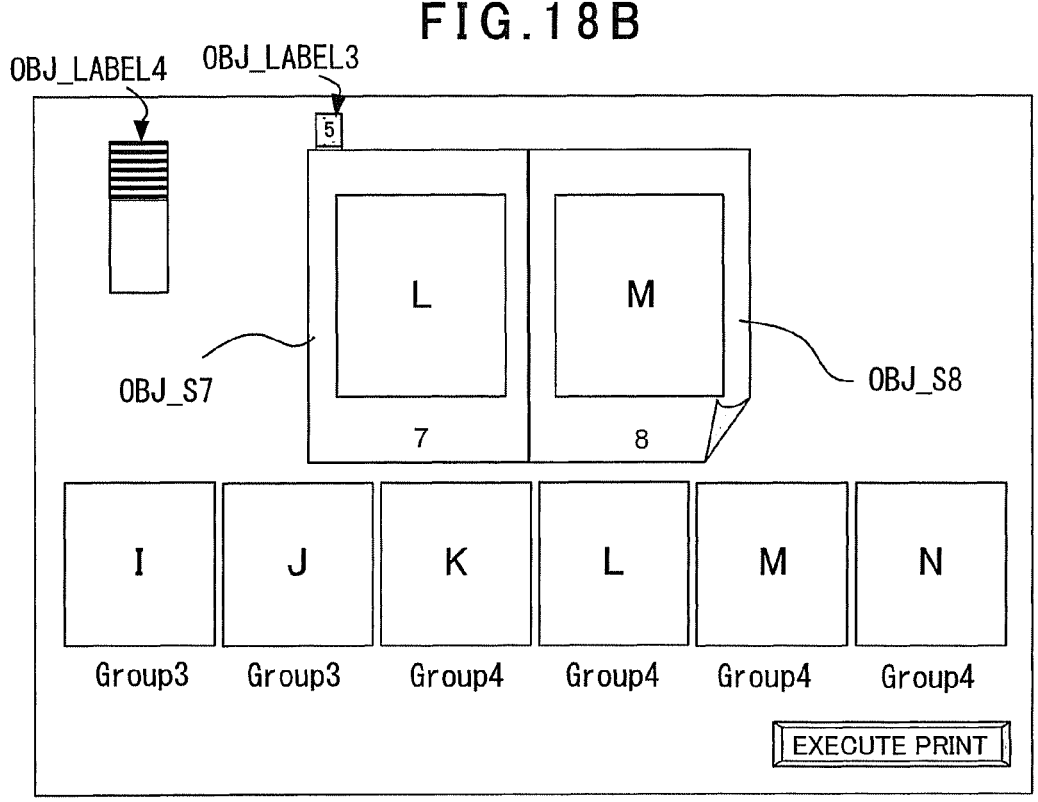
FIG. 18B is a view showing an example where the number of a sheet object is displayed on a label object that is placed on the sheet object of the same number.

A label object is placed such that the upper end portion thereof projects from the upper end of a sheet object. Meanwhile, this projecting region of the label object may be given a sheet object number as shown in FIG. 18B. Press of this projecting region may realize a jump to the corresponding sheet object. In response, the condition of placement on the destination sheet object (in this example, sheet object of number 5) appears.

An image in the form of a label is used in the description given above. However, a label is not the only example, but any image is applicable such as an image with a mark that can be identified by a user and an image of an identifiable shape (marking image).

The descriptions given above regarding the first and second embodiments particularly refer to the case where print setting including Nin1 setting and setting for selecting single-sided or duplex printing is made for each group and not for an entire document (however, print setting can be made for an entire document). In addition to these settings, examples of print setting may also include various settings such as setting for determining if a sheet is to be placed in a portrait position or a landscape position, setting for determining a destination of discharge of a sheet after printing, image quality setting for printing, setting for selecting color printing or monochrome printing, setting for determining the presence or absence of a watermark, setting for determining the number of sets of pages, stapling or hole punching setting, and setting for determining the position of pages to be opened. Printing process may be executed after these various print settings are reflected in each group. If there is a plurality of sheet storing sections 20, a unit to feed sheets can be selected for each group.

As described in detail above, the technique described herein can make different print settings in one document.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a display section configured to allow a plurality of first images in the form of sheets and a plurality of second images printed on sheets to be displayed on the display section;
an input section configured to acquire information about a position designated by a user, the position being within a display region of the display section;
a controller configured to detect that one or two or more of the plurality of second images are selected on the basis of the information about the position acquired by the input section, to make setting such that, in response to release of the selected second image on one of the plurality of first images, the released second image is categorized in one group, and to make print setting for each group, the released second image is placed on the first image, and if one of the second images placed on the first images is selected, the controller caused the display section to display a print setting dialog about a group to which the selected second image belongs, the print setting dialog is displayed to overlap on an area of the first image and displayed in a different window; and
a printing section configured to print the second image on a sheet on the basis of the print setting made by the controller.

2. An image forming apparatus, comprising:
a display section configured to allow a plurality of first images in the form of sheets, a plurality of second images printed on sheets and placed on the first images, and at least one third image functioning as a marking image to be displayed on the display section;
an input section configured to acquire information about a position designated by a user, the position being within a display region of the display section;
a controller configured to detect that the third image is selected on the basis of the information about the position acquired by the input section, to make group setting such that, in response to release of the selected third image on one of the plurality of first images, a second image placed on the first image on which the third image is released is categorized in one group, and to make print setting for each group, and if one of the second images placed on the first images is selected, the controller caused the display section to display a print setting dialog about a group to which the selected second image belongs, the print setting dialog is displayed to overlap on an area of the first image and displayed in a different window; and a printing section configured to print the second image on a sheet on the basis of the print setting made by the controller.

3. A print setting unit, comprising:

a display section configured to allow a plurality of first images in the form of sheets and a plurality of second images printed on sheets to be displayed on the display section an input section configured to acquire information about a position designated by a user, the position being within a display region of the display section; and a controller configured to detect that one or two or more of the plurality of second images are selected based on the information about the position acquired by the input section, to make setting such that, in response to release of the selected second image on one of the plurality of first images, the released second image is categorized in one group, and to make print setting for each group, the released second image is placed on the first image, and if one of the second images placed on the first images is selected, the controller caused the display section to display a print setting dialog about a group to which the selected second image belongs, the print setting dialog is displayed to overlap on an area of the first image and displayed in a different window.

4. The print setting unit according to claim 3, wherein a setting button is displayed on the print setting screen on the display section, the setting button being used for deleting the selected second image placed on the first image from a group to which the selected second image belongs.

5. The print setting unit according to claim 3, wherein the controller makes Nin1 print setting for a group to which the second images belong, the Nin1 print setting determining that N images targeted for printing are to be placed on one side of a sheet and then printed on the basis of the number of second images placed on one first image.

6. The print setting unit according to claim 3, wherein the print setting includes Nin1 print setting and setting for selecting single-sided or duplex printing, the Nin1 print setting determining that N images targeted for printing are to be placed on one side of a sheet and then printed, and if one or both of the Nin1 setting and the setting for selecting single-sided or duplex printing are changed, the second images placed on the first images are displayed again on the display section in a layout determined on the basis of setting after the change.

7. A print setting unit, comprising:

a display section configured to allow a plurality of first images in the form of sheets, a plurality of second images printed on sheets and placed on the first images, and at least one third image functioning as a marking image to be displayed on the display section;

an input section configured to acquire information about a position designated by a user, the position being within a display region of the display section; and a controller configured to detect that the third image is selected on the basis of the information about the position acquired by the input section, to make group setting such that, in response to release of the selected third image on one of the plurality of first images, a second image placed on the first image on which the third image is released is categorized in one group, and to make print setting for each group, and if one of the second images placed on the first images is selected, the controller caused the display section to display a print setting dialog about a group to which the selected second image belongs, the print setting dialog is displayed to overlap on an area of the first image and displayed in a different window.

8. The print setting unit according to claim 7, wherein the controller further makes group setting such that the second image placed on the first image on which the third image is released, and a second image placed on a first image corresponding to a sheet coming before a sheet of the first image on which the third image is released, are categorized in the same group.

9. The print setting unit according to claim 8, wherein the controller makes group setting such that a second image placed on a first image corresponding to a page coming after a page of the first image on which the third image is released is categorized in a group different from the group.

10. The print setting unit according to claim 7, wherein if the third image is placed on the first image, a fourth image with a mark different from a mark of the third image is further displayed on the display section, and if the fourth image with the different mark is placed on a different first image, the controller makes group setting such that at least a second image placed on the different first image is categorized in a group different from the group.

11. The print setting unit according to claim 7, wherein the controller makes Nin1 print setting for a group to which the second images belong, the Nin1 print setting determining that N images targeted for printing are to be placed on one side of a sheet and then printed on the basis of the number of second images placed on one first image.

12. A print setting method, comprising:

causing a plurality of first images in the form of sheets and a plurality of second images targeted for printing to be displayed on a display section;

acquiring information about a position designated by a user from an input section, the position being within a display region of the display section;

detecting that one or two or more of the plurality of second images are selected on the basis of the information about the position acquired by the input section, making setting such that, in response to release of the selected second image on one of the plurality of first images, the released second image is categorized in one group, and making print setting for each group, the released second image is placed on the first image, and if one of the second images placed on the first images is selected, the controller caused the display section to display a print setting dialog about a group to which the selected second image belongs, the print setting dialog is displayed to overlap on an area of the first image and displayed in a different window; and printing the second image on sheets on the basis of the print setting.

13. The print setting method according to claim 12, wherein a setting button is displayed on the print setting screen on the display section, the setting button being used for deleting the selected second image placed on the first image from a group to which the selected second image belongs.

14. The print setting method according to claim 12, wherein Nin1 print setting is made for a group to which the second images belong, the Nin1 print setting determining that N images targeted for printing are to be placed on one side of a sheet and then printed on the basis of the number of second images placed on one first image.

15. The print setting method according to claim 12, wherein
- the print setting includes Nin1 print setting and setting for selecting single-sided or duplex printing, the Nin1 print setting determining that N images targeted for printing are to be placed on one side of a sheet and then printed, and
- if one or both of the Nin1 setting and the setting for selecting single- sided or duplex printing are changed, the second images placed on the first images are displayed again on the display section in a layout determined on the basis of setting after the change.

16. A print setting method, comprising:
- causing a plurality of first images in the form of sheets, a plurality of second images targeted for printing and placed on the first images, and at least one third image functioning as a marking image to be displayed on a display section;
- acquiring information about a position designated by a user from an input section, the position being within a display region of the display section;
- detecting that the third image is selected on the basis of the information about the position acquired by the input section, making group setting such that, in response to release of the selected third image on one of the plurality of first images, a second image placed on the first image on which the third image is released is categorized in one group, and making print setting for each group, and if one of the second images placed on the first images is selected, the controller caused the display section to display a print setting dialog about a group to which the selected second image belongs, the print setting dialog is displayed to overlap on an area of the first image and displayed in a different window; and
- printing the second image on sheets on the basis of the print setting.

17. The print setting method according to claim 16, wherein group setting is also made such that the second image placed on the first image on which the third image is released, and a second image placed on a first image corresponding to a sheet corning before a sheet of the first image on which the third image is released, are categorized in the same group.

18. The print setting method according to claim 17, wherein group setting is made such that a second image placed on a first image corresponding to a page corning after a page of the first image on which the third image is released is categorized in a group different from the group.

19. The print setting method according to claim 16, wherein
- if the third image is placed on the first image, a fourth image with a mark different from a mark of the third image is further displayed on the display section, and
- if the fourth image with the different mark is placed on a different first image, group setting is made such that at least a second image placed on the different first image is categorized in a group different from the group.

20. The print setting method according to claim 16, wherein Nin1 print setting is made for a group to which the second images belong, the Nin1 print setting determining that N images targeted for printing are to be placed on one side of a sheet and then printed on the basis of the number of second images placed on one first image.

21. The image forming apparatus according to claim 1, wherein the print setting dialog is a dialog to be set to N-in-1.

22. The image forming apparatus according to claim 2, wherein the print setting dialog is a dialog to be set to N-in-1.

23. The print setting unit according to claim 3, wherein the print setting dialog is a dialog to be set to N-in-1.

24. The print setting unit according to claim 7, wherein the print setting dialog is a dialog to be set to N-in-1.

25. The print setting unit according to claim 12, wherein the print setting dialog is a dialog to be set to N-in-1.

26. The print setting unit according to claim 1, wherein the input section comprises a unit that forms an image in cyan, magenta, yellow and black on a sheet.

27. The print setting unit according to claim 2, wherein the input section comprises a unit that forms an image in cyan, magenta, yellow and black on a sheet.

28. The print setting unit according to claim 3, wherein the input section comprises a unit that forms an image in cyan, magenta, yellow and black on a sheet.

29. The print setting unit according to claim 7, wherein the input section comprises a unit that forms an image in cyan, magenta, yellow and black on a sheet.

* * * * *